US012268983B2

(12) United States Patent
Suter et al.

(10) Patent No.: US 12,268,983 B2
(45) Date of Patent: Apr. 8, 2025

(54) ADSORBER STRUCTURE FOR GAS SEPARATION PROCESSES

(71) Applicant: CLIMEWORKS AG, Zürich (CH)

(72) Inventors: Roger Suter, Zürich (CH); Artur Tschense, Zürich (CH); Benjamin Megerle, Zürich (CH); Nicolas Repond, Zürich (CH); Christoph Gebald, Zürich (CH); Jan André Wurzbacher, Zürich (CH)

(73) Assignee: CLIMEWORKS AG, Zurich (CH)

( * ) Notice: Subject to any disclaimer, the term of this patent is extended or adjusted under 35 U.S.C. 154(b) by 647 days.

(21) Appl. No.: 17/601,749

(22) PCT Filed: Jun. 12, 2020

(86) PCT No.: PCT/EP2020/066340
§ 371 (c)(1),
(2) Date: Oct. 6, 2021

(87) PCT Pub. No.: WO2020/254208
PCT Pub. Date: Dec. 24, 2020

(65) Prior Publication Data
US 2022/0193598 A1 Jun. 23, 2022

(30) Foreign Application Priority Data

Jun. 21, 2019 (EP) .................................. 19181818
Dec. 16, 2019 (EP) .................................. 19216398

(51) Int. Cl.
*B01D 53/04* (2006.01)

(52) U.S. Cl.
CPC ..... *B01D 53/0446* (2013.01); *B01D 53/0438* (2013.01); *B01D 2253/112* (2013.01);
(Continued)

(58) Field of Classification Search
CPC ............ B01D 53/0446; B01D 53/0438; B01D 2253/112; B01D 2253/202;
(Continued)

(56) References Cited

U.S. PATENT DOCUMENTS 4,022,581 A * 5/1977 Rudorfer ................ B01J 8/0207
422/239
4,041,591 A * 8/1977 Noll .......................... F28F 7/02
428/117
(Continued)

FOREIGN PATENT DOCUMENTS

EP        0155336 A1    9/1985
EP        0222731 A2    5/1987
(Continued)

OTHER PUBLICATIONS

International Search Report dated Sep. 9, 2020 in Application No. PCT/EP2020/066340.
(Continued)

*Primary Examiner* — Stephen Hobson
(74) *Attorney, Agent, or Firm* — Sughrue Mion, PLLC

(57) ABSTRACT

A device for the separation of a carbon dioxide of a gas stream by using a bed of particulate adsorber particles contained in a sorbent particle volume, comprising at least two inlet channels and at least two outlet channels in said sorbent particle volume, the inlet channels and outlet channels mutually intertwining at least partly to form a nested structure and being arranged parallel to each other. The inlet channels and outlet channels are alternatingly arranged in both lateral dimensions so that the sorbent particle volume is confined by the interspace defined by adjacent side walls of inlet and outlet channels. Further, the sorbent particle volume surrounds the channels circumferentially.

40 Claims, 7 Drawing Sheets

(52) U.S. Cl.
CPC .. *B01D 2253/202* (2013.01); *B01D 2253/304* (2013.01); *B01D 2257/504* (2013.01); *B01D 2257/80* (2013.01); *B01D 2258/0283* (2013.01); *B01D 2258/06* (2013.01)

(58) Field of Classification Search
CPC ........ B01D 2253/304; B01D 2257/504; B01D 2257/80; B01D 2258/0283; B01D 2258/06; B01D 53/0407; B01D 2253/204; Y02C 20/40
See application file for complete search history.

(56) References Cited

U.S. PATENT DOCUMENTS

| | | | | |
|---|---|---|---|---|
| 4,390,355 | A * | 6/1983 | Hammond, Jr. | B01D 46/247 55/DIG. 30 |
| 4,416,676 | A * | 11/1983 | Montierth | B01D 46/2482 428/116 |
| 5,098,455 | A * | 3/1992 | Doty | C04B 35/185 428/116 |
| 5,198,007 | A * | 3/1993 | Moyer | B01D 39/2075 55/DIG. 30 |
| 5,260,035 | A * | 11/1993 | Lachman | F01N 13/0097 422/177 |
| 5,720,787 | A * | 2/1998 | Kasai | F01N 3/0222 55/282 |
| 5,863,311 | A * | 1/1999 | Nagai | B01D 46/247 55/525 |
| 6,090,187 | A * | 7/2000 | Kumagai | F01N 13/0097 60/303 |
| 6,669,751 | B1 * | 12/2003 | Ohno | B01D 46/2429 55/483 |
| 6,753,294 | B1 * | 6/2004 | Brisley | B01J 35/56 502/400 |
| 7,407,533 | B2 * | 8/2008 | Steins | B01D 53/0415 55/385.3 |
| 7,462,224 | B2 | 12/2008 | Wolff | |
| 7,487,875 | B2 | 2/2009 | Zimmerman et al. | |
| 7,722,705 | B2 * | 5/2010 | Gadkaree | B01D 53/06 95/134 |
| 7,927,393 | B2 * | 4/2011 | Sanami | B01D 46/527 55/502 |
| 8,268,043 | B2 | 9/2012 | Celik et al. | |
| 8,852,322 | B2 * | 10/2014 | Gupta | C10L 3/104 96/108 |
| 9,657,625 | B2 * | 5/2017 | Boorse | F01N 3/0222 |
| 9,751,039 | B2 * | 9/2017 | Gebald | B01D 53/0415 |
| 9,981,881 | B2 * | 5/2018 | Noguchi | C04B 38/0012 |
| 9,993,771 | B2 * | 6/2018 | Voss | F01N 3/0821 |
| 10,159,934 | B2 * | 12/2018 | Kitamura | B01D 53/945 |
| 10,207,258 | B2 * | 2/2019 | Patil | B01J 35/19 |
| 10,315,192 | B2 * | 6/2019 | Aoki | B01D 53/9445 |
| 10,335,759 | B2 * | 7/2019 | Ramler | B01J 19/0093 |
| 10,427,086 | B2 * | 10/2019 | Gebald | B01D 53/0415 |
| 10,653,998 | B2 * | 5/2020 | Yamamoto | B01D 46/2429 |
| 10,808,585 | B2 * | 10/2020 | Chandler | B01D 53/9472 |
| 10,814,266 | B2 * | 10/2020 | Kato | B01D 46/00 |
| 10,830,113 | B2 * | 11/2020 | Nagai | F01N 3/0222 |
| 10,850,223 | B2 * | 12/2020 | Miyairi | B01D 46/2455 |
| 10,857,498 | B2 * | 12/2020 | Miyairi | F01N 3/0222 |
| 11,071,939 | B2 * | 7/2021 | Meirav | B01D 53/0415 |
| 11,097,260 | B2 * | 8/2021 | Kurihara | B01J 35/56 |
| 11,149,604 | B2 * | 10/2021 | Sugawara | B01J 35/657 |
| 11,187,127 | B2 * | 11/2021 | Hruby | F01N 3/0885 |
| 11,208,931 | B2 * | 12/2021 | Kurihara | F01N 3/2828 |
| 11,266,982 | B2 * | 3/2022 | Kurihara | B01J 23/10 |
| 11,280,236 | B2 * | 3/2022 | Yoshioka | B01J 35/57 |
| 11,280,237 | B2 * | 3/2022 | Yoshioka | B01J 35/57 |
| 11,331,653 | B2 * | 5/2022 | Patchett | F01N 3/2066 |
| 2005/0196586 | A1 * | 9/2005 | Shimodaira | C04B 41/89 428/116 |
| 2008/0060524 | A1 | 3/2008 | Tumbrink et al. | |
| 2008/0078532 | A1 * | 4/2008 | Nagashima | F28F 13/003 165/104.34 |
| 2009/0120288 | A1 | 5/2009 | Lackner et al. | |
| 2010/0135866 | A1 * | 6/2010 | Mizuno | B01D 46/2482 264/630 |
| 2011/0041688 | A1 | 2/2011 | Eisenberger | |
| 2011/0203242 | A1 * | 8/2011 | Goto | B01D 46/2484 55/523 |
| 2012/0174778 | A1 | 7/2012 | Eisenberger | |
| 2013/0312606 | A1 | 11/2013 | Eisenberger | |
| 2015/0152768 | A1 * | 6/2015 | Arulraj | B01J 29/46 428/117 |
| 2017/0014763 | A1 * | 1/2017 | Crawford | F01N 3/2013 |
| 2017/0022868 | A1 * | 1/2017 | Crawford | B01D 53/94 |
| 2017/0218823 | A1 * | 8/2017 | Crawford | F01N 3/2828 |
| 2019/0003363 | A1 * | 1/2019 | Crawford | B01D 53/9431 |
| 2019/0070596 | A1 * | 3/2019 | Yang | B01J 23/745 |
| 2021/0115825 | A1 * | 4/2021 | Miyairi | B01D 46/42 |
| 2021/0322947 | A1 * | 10/2021 | Mizukami | B01F 25/45221 |
| 2021/0346880 | A1 * | 11/2021 | Miyairi | B01J 35/23 |
| 2023/0321643 | A1 * | 10/2023 | Ichikawa | B01J 23/862 502/439 |
| 2023/0356198 | A1 * | 11/2023 | Caudle | B01J 23/005 |
| 2023/0358156 | A1 * | 11/2023 | Grace | F01N 3/2839 |
| 2024/0198275 | A1 * | 6/2024 | Scotti | B01D 53/0462 |

FOREIGN PATENT DOCUMENTS

| | | |
|---|---|---|
| WO | 2009/149292 A1 | 12/2009 |
| WO | 2010/022339 A2 | 2/2010 |
| WO | 2014/170184 A1 | 10/2014 |
| WO | 2015/082567 A1 | 6/2015 |
| WO | 2016/005226 A1 | 1/2016 |
| WO | 2016/185387 A | 11/2016 |
| WO | 2017/009241 A1 | 1/2017 |
| WO | 2018/083109 A1 | 5/2018 |
| WO | 2018/210617 A1 | 11/2018 |

OTHER PUBLICATIONS

Written Opinion of the International Searching Authority dated Sep. 9, 2020 in Application No. PCT/EP2020/066340.

* cited by examiner c)

a)

b)

c)

a)

b)

ADSORBER STRUCTURE FOR GAS SEPARATION PROCESSES

CROSS REFERENCE TO RELATED APPLICATIONS

This application is a National Stage of International Application No. PCT/EP2020/066340, filed Jun. 12, 2020, claiming priorities to European Patent Application No. 19181818.6, filed Jun. 21, 2019 and European Patent Application No. 19216398.8, filed Dec. 16, 2019.

TECHNICAL FIELD

The present invention relates to low pressure drop adsorber structures for granular sorbent materials, to methods of making such structures, and to the use of such structures for gas separation processes in particular the capture of $CO_2$ from atmospheric air.

PRIOR ART

Gas separation by adsorption is a rather well-established industrial method for the removal of a specific gaseous component from a gas mixture either for the refining of the base gas flow or for the enrichment of the removed component. One important application which is gaining importance is the removal of carbon dioxide ($CO_2$) from gas streams for example flue or exhaust gases, industrial waste gases, biogas or even atmospheric air. Specifically for the fulfillment of climate protection goals, the latter—known as direct air capture (DAC)—is of critical importance as it can address dispersed (i.e. those from mobility) as well as past emissions. Further it does not need to be coupled to emission sources allowing the use of locally available favorable energy sources or processing infrastructure and can provide a real closed carbon cycle when applied to synthetic fuels with no or very little $CO_2$ emissions. In recent years, several techniques and processes for DAC have been developed. For example, US-A-2011/041688 discloses carbon dioxide capture/regeneration structures and techniques; US-A-2009/0120288 discloses a method for removal of carbon dioxide from air; US-A-2012/0174778 discloses a carbon dioxide capture/regeneration method using a vertical elevator; and WO-A-2010022339 discloses a carbon dioxide capture method and facility. Possible sorbent materials suitable for DAC have been also disclosed in the prior art.

While granular sorbent materials offer very high specific surface areas and a large volumetric capacity, they suffer high specific pressure drops and the need to contain granular materials thereby leading some groups (WO-A-2009149292) to use amine functionalized planar structures (i.e. monoliths). In the context of granular materials, WO-A-2017/009241 discloses an amine functionalized solid support. Others, for example WO-A-2016/185387 have used supports functionalized with $K_2CO_3$.

DAC processes based on temperature and pressure swings optionally with purge gases on the other hand have been disclosed for particular sorbent types in for example WO-A-2016/005226, WO-A-2015/082567 or US-A-2013/312606.

In all these methods, one central challenge is contacting atmospheric air, or more generally the gaseous stream to be separated, with a medium—sorbent material—which selectively binds one gas, in particular $CO_2$. In contrast to applications in which $CO_2$ is present at high concentration, due the low concentration of $CO_2$ in the atmosphere, DAC systems must handle very large air volumes, posing challenges related to energy demand and pressure drop and rendering typical adsorption columns with long packed bed lengths unsuitable. To address these limitations, recently, three systems were disclosed for the utilization of granular materials for DAC: WO-A-2014/170184, WO-A-2018083109 and WO-A-2018 210617. These three publications also disclose adsorber structures with integrated heat exchange structures fed by heat transfer liquids to realize temperature swings on the granular sorbent materials.

The following disclosures are based on the concept of 'wall flow' units prevalent in filtering applications such as particle or catalytic filters: U.S. Pat. No. 4,390,355 or 6,753,294 B1 with the notable difference that instead of having a gas permeable wall which retains impurities, here a plurality of units formed of enclosed sorbent material held in gas permeable fabric material is used. Further examples of wall flow adsorption structures from the prior art can be found in U.S. Pat. Nos. 5,260,035, 7,407,533 B2, 8,852,322 B2 and 8,268,043 B2. While these devices of the prior art address the challenge of producing packed bed structures with low pressure drop, they fail to address the challenge of the exchange of sorbent material upon it reaching the end of its usable life thusly leading to very work intensive and costly exchange operations, wherein individual units—for example individual frame structure or channels—must be tediously dismantled or emptied. Such challenges may be solved by assemblies wherein the filter is one, replaceable assembly such as common in candle or cartridge filter units of for example U.S. Pat. No. 7,487,875 or EP-A-0 155 336. Some devices like US-A-2008/0078532 have combined cartridge type systems and casings, but lack the benefits of wall flow devices for exploiting the adsorption properties of granular adsorber materials and fail to utilize the benefits afforded by continuous sorbent material volumes. Similarly, documents such as U.S. Pat. No. 7,462,224 relate to monolithic structures of adsorption material, which however are not used for flow through the filter walls but just to flow across, and replacement is only possible by way of full replacement of the monolith.

US-A-2008/060524 proposes a filter element with a filter medium that is made of at least two filter web layers and an adsorptive layer of adsorptive particles, which adsorptive layer is substantially enclosed by the at least two filter web layers with the exception of lateral open edges. A sealing compound seals the lateral open edges at least during manufacture of the filter element. A frame part is attached by injection molding to the filter medium after sealing the open lateral edges with the sealing compound.

U.S. Pat. No. 4,022,581 discloses a device for the recovery of noble metals emanating from the surface of catalysts used in high pressure high temperature gas reactions involving absorbing the noble metal dispersed in the reaction gas in an intercepting bed formed of acid-soluble metal oxides wherein the flow of the reaction gases in the intercepting bed is in a direction parallel to the plane of the supporting base of the bed.

EP-A-0 222 731 discloses a pressure-swing adsorber constisting of a pressure-resistant vessel with inlet branches and outlet branches for the gas which is to be purified. The granular adsorbent is held in annular chambers between cylindrical walls which are of at least partially gas-permeable design. To reduce compression of the granular adsorbent during pressure-swing stresses and/or temperature stresses for the purpose of desorption, supporting surfaces are provided which extend radially across the internal width between the cylinder shells and are supported in the axial direction.

SUMMARY OF THE INVENTION

It is therefore one purpose of this invention to make available an adsorber structure suitable for loose granular adsorber materials offering the advantages of high contact area and low pressure drop of wall flow structures with the handling and exchange properties of candle and cartridge type adsorber structures and allowing for easy loose granular adsorber material exchange, in particular structures allowing for high volume flow rates for DAC applications. The present invention in line with this relates to a device for the separation of at least one gaseous component of a gas stream containing that component as well as further different gaseous components, in particular for the separation of carbon dioxide and/or water vapour (normally just carbon dioxide or carbon dioxide and water) from an air stream, by using a bed of loose particulate adsorber particles contained in at least one sorbent particle volume. Said gas stream is entering the device at an upstream end thereof and exiting the device as a gas outflow at a downstream end thereof.

Said device comprises at least two inlet channels as well as at least two outlet channels in said sorbent particle volume, and the inlet channels and outlet channels are mutually intertwining at least partly to form a nested structure in said sorbent particle volume (nested in a direction parallel to the main flow direction) and being arranged with their principal axes all essentially parallel to each other.

So to speak by way of this arrangement of the inlet and outlet channels the sorbent particle volume is forming a three-dimensional grid, the channels forming the holes in this grid. The channels in this grid are therefore all or at least most of them circumferentially surrounded by the sorbent particle volume, and in particular if the volume is a contiguous volume, the structure allows easy handling of the loose particulate sorbent particles located in that volume, for example for initial mounting, refilling, or replacement. A contiguous volume in this context is to be understood as a volume which is coherent and in which there are no separating wall structures which would hinder the flow of the particulate adsorber particles contained in the sorbent particle volume. There may be stabilising struts or the like within such a contiguous volume, but only to the extent that they would not impede an essentially free flow of the particulate adsorber particles within the volume.

Said inlet channels have, at the upstream end, at least one inlet opening through which said gas stream enters the device, and they are closed to airflow at the downstream end. Said upstream end and downstream end of the inlet channels are connected by one or a plurality of side walls circumferentially enclosing and forming said inlet channel in said sorbent particle volume.

Similarly, or equivalently, said outlet channels are closed at the upstream end and have at the downstream end at least one outlet opening through which the gas outflow is exiting the device, said upstream and downstream end of the outlet channels being connected by one or a plurality of side walls circumferentially enclosing and forming said outlet channel in said sorbent particle volume.

Importantly, for containing the loose particulate adsorber particles, said side walls are permeable to the gas stream but impermeable for said loose particulate adsorber particles.

To fulfil that function, the side walls may consist of one single grid having that property, but they may also consist of several grid-like structures, for example a first grid with large mesh width, not able to retain the particulate adsorber particles, but providing the structural rigidity required, and a second grid or mesh, which can also be a textile/woven or un-woven, having the property of being impermeable for said loose particulate adsorber particles, but taken alone not having sufficient structural strength. The first grid and the second grid or mesh can be point wise connected.

Viewed along their axes according to the invention the inlet channels and outlet channels are alternatingly arranged in both lateral dimensions (the lateral directions being the directions essentially perpendicular to the main gas flow direction from the upstream end of the device and to the downstream end of the device) so that said sorbent particle volume is confined by the interspace defined by adjacent side walls of inlet channels and neighboring outlet channels and said sorbent particle volume is essentially surrounding the channels circumferentially around their principal axes.

By way of this intertwined and alternating arrangement of the inlet and outlet defining the sorbent particle volume an optimum structure preferably having one contiguous volume is provided, which can be flown through by the air entering the inlet channels and then guided outside of the device by way of the outlet channels, and having an optimum bed geometry in three dimensions, and at the same time providing a structure which can be easily assembled and maintained. The device may contain one single such contiguous volume or it may contain a plurality of such contiguous volumes, each of these volumes being defined by at least at least two inlet channels as well as at least two outlet channels in said sorbent particle volume.

The invention is thus, worded alternatively, an adsorber structure for the separation of at least one component of a gas stream characterized by a plurality of substantially parallel gas inlet and outlet gas channels. The gas inlet channels are open to the gas flow at the inlet side of the adsorber structure and impermeable at the face of the same channel at the outlet extremity of the adsorber structure and with gas outlet channels impermeable to the gas flow at the inlet axial face of the adsorber structure and wherein the face of the same channel at the outlet extremity of the adsorber structure being open to the outlet gas flow. The gas channels are extending in the axial direction and separated from each other in a substantially radial or lateral direction with the channels being lined with a gas permeable and particle impermeable material and wherein preferably said channels are retained and sealed on two axial walls with further circumferential walls forming the boundaries of the adsorber structure. Preferably the adsorber structure has at least two ports, e.g. at its upper and lower extremities, through which a granular sorbent material can be passed to occupy the space between the axial, circumferential walls and between the gas channels.

According to a preferred embodiment of the present invention, the device comprises one single contiguous sorbent particle volume.

Preferably, the minimum thickness of the sorbent particle volume, defined as the distance between adjacent side walls of neighboring inlet and outlet channels, is at least 5 mm, more preferably at least 7 mm or at least 10 mm, most preferably at least 15 mm or the thickness thereof is preferably in the range of 5-50 or 15-50 mm or 10-30 or 20-30 mm, or in the range of 5-25 mm or 7-18 mm. These thickness specifications are preferably given over at least 70% of the area of the side walls, or over at least 80%, or 90% of the area of the side walls, or preferably over all of the area of the side walls in the device.

In a preferred embodiment of the invention, the radial spacing between gas inlet and outlet channels—effectively the sorbent layer thickness—can lie between 5 and 150 mm, preferably between 10 and 50 mm or 20 and 50 mm and more preferably in the range of 7 and 30 mm or 7 to 25 mm, and can optionally be varied in the axial direction by utilizing channels of different geometries at the outlet versus the inlet with a variability a of the sorbent layer thickness at the outlet end of the adsorber structure of +/−30% of the inlet sorbent layer thickness.

Varying cross sectional forms, radial spacings, the variability a of the sorbent layer thickness and orientations offer the possibility of firstly optimizing the pressure drop of the channel versus that of the sorbent material. For instance, a sorbent material with a high specific pressure drop (defined for instance in Pa/m/(m/s)) may be more suitable to a larger flow through area such as would be afforded by a channel with a larger ratio of circumference to cross sectional area. Thusly, the channel may have a slightly larger pressure drop however the sorbent materials layer correspondingly a lower one due to the increase in available flow through area. Conversely, low specific pressure drop sorbent materials may benefit from larger volume flows enabled by channels with higher cross sectional area and lower circumference. Secondly, the available adsorber structure cross sectional areas can be fully utilized with the correct channel form and combination of channels forms and thus allow for the highest amount of sorbent in contact with gas flow. Thirdly, regions at the edges or corners of the adsorber structure where the sorbent density is lower due to the circumferential walls may benefit from sorbent channels of lower cross section or specific form so that the specific gas flow (defined for instance in $Nm^3/h/kg$ where N represents 'normal' conditions of standard temperature and pressure (0° C. and 100 kPa (absolute)) can be maintained constant throughout the adsorber structure. Finally, by varying the sorbent layer thickness, varying sorbent materials can be best utilized and be assured of homogenous loading with the adsorbate. Materials with higher specific pressure drop require a lower flow through speed over a shorter flow through distance in order that the pressure drop over the adsorber structure is acceptable. Overall, the flexibility of varying and combining channels forms, sizes, orientations can lead to an adsorber structure optimized for pressure drop, gas flow distribution and thusly adsorbate uptake kinetics. In comparison to the state of the art it is a central advantage of this invention, that it allows the application of sorbent materials with high specific pressure drops, typically featuring small average diameters in the range of 0.01-1 mm. This can be achieved through the aforementioned optimization potentials as well as the absence of flow restriction causing heat transfer structures and makes the invention particularly attractive for application to the separation of dilute adsorbate streams and rapid cycling as is encountered for example in the extraction of $CO_2$ from ambient air.

Preferably, the device is suitable and adapted for capturing $CO_2$ from ambient atmospheric air.

In the context of this disclosure, the expressions "ambient atmospheric pressure" and "ambient atmospheric temperature" refer to the pressure and temperature conditions to that a plant that is operated outdoors is exposed to, i.e. typically ambient atmospheric pressure stands for pressures in the range of 0.8 to 1.1 barabs and typically ambient atmospheric temperature refers to temperatures in the range of −40 to 60° C., more typically −30 to 45° C. The gas mixture used as input for the device is preferably ambient atmospheric air, i.e. air at ambient atmospheric pressure and at ambient atmospheric temperature, which normally implies a $CO_2$ concentration in the range of 0.03-0.06% by volume. However, also air with lower or higher $CO_2$ concentration can be used as input for the process, e.g. with a concentration of 0.1-0.5% by volume, so generally speaking preferably the input $CO_2$ concentration of the input ambient atmospheric air is in the range of 0.01-0.5% by volume.

According to a further preferred embodiment, said sorbent particle volume is surrounding the channels circumferentially around their principal longitudinal axes over at least 70% or at least 90% or preferably over essentially the whole of their axial length.

The cross-sectional shape of the inlet channels and/or of the outlet channels can be circular, oval, polygonal, or a combination thereof. Preferably, the cross-sectional shape is triangular, rectangular or hexagonal, most preferably forming a regular triangle, square or a regular hexagon.

So in accordance with a preferred embodiment of the present invention the cross sectional form of the inlet and outlet gas channels can be a form which offers repetitive, regular cross sections while producing a spacing of preferably essentially constant thickness in the lateral direction— and therefore a sorbent layer of essentially constant thickness—to the neighboring outlet gas channel wherein optionally, various channel cross sectional forms and characteristic dimensions can be combined in a single adsorber structure. Gas channels can be tapered or rotated around their longitudinal axis. The specific dimensions can be adapted to obtain an optimum flow characteristic and an as little pressure drop over the whole of the device as possible.

According to a further preferred embodiment, the cross-sectional shape of the inlet channels and/or of the outlet channels is essentially the same in the sense of geometrical similarity, or exactly the same, along the axial length thereof between the upstream end and the downstream end. When talking about geometrical similarity, preferably the size of this cross-sectional shape is decreasing from the upstream end to the downstream end in case of the inlet channels and/or the size of the cross-sectional shape is increasing from the upstream end to the downstream end in case of the outlet channels. The tapering angle for the inlet and the outlet channels can be the same with opposite direction, leading to an essentially constant bed thickness along the longitudinal extension of the device. However in order to optimize flow and pressure drop characteristics and efficient use of the particulate volume, the tapering angle can also be chosen to be different for the inlet and for the outlet channels, respectively.

Further preferably, from the upstream end to the downstream end the cross-sectional shape reduces in area in the range of 5-50% for the inlet channels and from the downstream end to the upstream end in area in the range of 5-50% for the outlet channels.

Alternatively speaking or in addition to that, the opening angle of the inlet and/or outlet channels, defined as the average angle between opposite sidewalls thereof, can be in the range of 0-60°, preferably in the range of 0.2-30°, 1-30° or 2-15°, in particular in the range of 0.2-2° or 3-7°.

The size of the cross-sectional shape of the inlet channels and of the outlet channels at any one given longitudinal position of the device can be essentially the same for all channels.

Preferably, the size of the cross-sectional shape is essentially the same at any longitudinal positions just for the inlet channels and respectively essentially the same at any longitudinal positions just for the outlet channels, typically with only one lateral position, e.g. at the center of the device, where the cross-sectional shape of the inlet channels and of the outlet channels is the same. Preferably the size of the geometrically similar cross-sectional shapes is, preferably continuously, increasing in a downstream direction for the outlet channels and is, preferably continuously, increasing in an upstream direction for the inlet channels.

Further preferably thus, adjacent side walls of neighboring channels (to be understood as neighboring inlet and outlet channels) are arranged parallel to each other, forming preferably a regular tessellation with interspaces in the lateral directions, with the same lateral distance between distanced adjacent inlet and outlet channels. Adjacent side walls of neighboring inlet and outlet channels forming sorbent particle layers of the volume can also have a lateral thickness which is varying over the (full) longitudinal direction by at most 50%, or at most 30%, wherein said lateral distance forms the (local) thickness of the sorbent particle layer, to optimize the pressure drop and the flow characteristics along the longitudinal direction in the device.

A regular tessellation is here to be understood as one which is regular at least at one particular cross section of the adsorber structure seen along the longitudinal axis but one which may—as in the case of tapered channels optionally in combination with varying sorbent material layer thicknesses—be different at other longitudinal positions. A special case is the situation of constant sorbent layer thickness, equal channel forms and non-tapered inlet and outlet channels hereby producing the same regular tessellation at any longitudinal position. Also included here in the term regular tessellation is a situation where, preferably at any longitudinal position, there is a regular 2D pattern in the two lateral directions having alternatingly two different sized cross-sectional shapes, one group being defined by the inlet channels and one by the outlet channels.

According to yet another preferred embodiment, the inlet channels are closed at their downstream end by a laterally arranged end plate and the outlet channels are closed at their upstream end by a laterally arranged end plate, wherein preferably these end plates are provided with means for mounting strainers forming the channels in a carrier structure.

The side walls can be provided by a mesh or grid structure, the mesh width of which is smaller than the smallest particle size of said particulate adsorber particles. Preferably the mesh is a wire grid, for example a metal wire grid, preferably an aluminium or stainless steel metal wire grid. As mentioned above, there can be provided two or more layers of grid, for example one first layer with a grid mesh width which is substantially larger than the smallest particle size of said particulate adsorber particles, acting as a carrier grid, and mounted thereon, preferably on the side facing the particulate adsorber particles, a second layer with a grid wire, preferably metal wire or polymer fibres (woven or unwoven) having mesh width smaller than the smallest particle size of said particulate adsorber particles, acting as retaining grid, wherein preferably the wire thickness of the carrier grid is larger than the wire thickness of the retaining grid and wherein optionally, further supporting grids are integrated into the air channels.

In a further embodiment of the invention, the channels can be built of a gas permeable material having a permeability of 2000-10000 L/m2/s preferably 3000-5000 L/m2/s with said material being a metal wire mesh for example of aluminum or stainless steel or plastic fabrics with said permeable material spanned in a circumferential fashion over a carrier grid having the form of the channel made of low specific weight and high specific strength material such as metallic wire mesh of aluminium or stainless steel defined by wire diameters in the range 0.5-3 mm and spacing 0.5-10 mm with pore sizes of said permeable material being in the range of 20 m up to 1 mm preferably in the range of 100-300 m, further wherein optionally, and specifically for channels with flat sides on the circumference and characteristic dimensions greater than 100 mm, reinforcement of the cage material by means of ribbing internal to the channels can be foreseen with said ribbing being metallic or plastic in the form of an extended cross along the entire axial length of the channel having at least one rib in the horizontal and vertical axes and where optionally, said ribs can be further perforated to reduce material intensity. The carrier grid material and material density can be optimized based on the sorbent density, packing height and the length of the channel offering the possibility of optimizing for thermal mass and material intensity. The ribbing can prevent inward bulging of the channel walls and produce a homogenous cross section of the channel without affecting the gas flow within the channel.

According to another preferred embodiment, the inlet channels are formed by inlet strainers and/or the outlet channels are formed by outlet strainers, preferably the strainers being built as separate structural elements for easy assembly and/or replacement. According to a preferred embodiment, the device contains at least four, preferably at least eight, more preferably at least 16 inlet strainers and at least four, preferably at least eight, more preferably at least 16 outlet strainers, wherein preferably there is an equal number of inlet strainers and outlet strainers, and wherein further preferably the device is surrounded by a circumferential enclosing wall and offering a gas seal against a containing structure housing the device. In each of these cases, preferably there is provided one single contiguous and coherent adsorber particle volume defined by the walls of the plurality of inlet and outlet strainers, and by at least one further circumferential containment wall structure.

Very preferably, in particular for DAC applications, the structure comprises a high number of inlet and outlet strainers, for example such a structure may comprise 100-400 inlet strainers and 100-400 outlet strainers, preferably 150-250 inlet strainers and 150-250 outlet strainers.

The inlet channels as well as the outlet channels are therefore further preferably enclosed by a circumferential enclosing wall as well as an upstream and downstream axial wall. Said walls can for example have a circumferential flange abutting against another flange of a containing structure housing the device, and wherein the device can preferably be opened on at least one side, preferably the upper side. In addition to that or alternatively the device can be provided with at least one media connection, by way of which the interspace forming the sorbent particle volume can be filled with said particulate adsorber particles and preferably at least one further lower media connection or re-sealable opening, preferably on the lower side, through which the particulate adsorber particles can be emptied.

The adsorber structure thus further can have at least one connection preferably more than one at the upper and lower edges of an axial wall for the delivery and removal respectively of a granular sorbent material wherein the connections are pipes of diameter 25-250 mm preferably 40-100 mm which penetrate into the space between the inlet and outlet channels with optionally, a sorbent plenum integrated into the upper portion of the adsorber structure with a height of 1-5 cm preferably less than 2 cm to accommodate any potential sorbent size changes or changes of the available volume for the sorbent.

Generally speaking, for filling or emptying the volume mechanical agitation such as pressurized air jets or vibration can be applied to support the distribution and packing of the sorbent material within the interspace sorbent volume during the filling and the same methods can optionally be applied when emptying the adsorber structure.

Thereby the invention offers significant benefits for the exchange of sorbent material against state of the art adsorber structures in which the sorbent material is enclosed in individual packets requiring that the contents of each packet be individually exchanged. In the disclosed invention, a granular sorbent material can be filled or emptied with as little as one operation per adsorber structure.

The arrangement of the channels in the device can be optimized for filling, emptying as well as replacement for example in that in case of polygonal it is make sure that there are no or only as little as possible horizontal side walls. For example in case of rectangular square cross sections of the channels, it is advantageous to orient a plurality of such channels such that the diagonal of the square or rectangle is oriented vertically, so that the side walls are inclined with respect to the vertical direction. In case of a triangular shape of the cross-section of the channels advantageously the triangles are oriented such that none of the side walls is oriented horizontally. For hexagonal cross sections advantageously the hexagons are oriented with one of their main diagonals in a vertical direction.

The channels can be affixed and supported in a gas impermeable manner in axial walls at the inlet and outlet ends of the adsorber structure wherein said fixation can be realized with mechanically affixed flanges, welding, gluing or fabricating the entire structure of one continuous material for example with 3D printing or injection molding. The circumferential and axial walls can be manufactured of aluminum, plastic, steel or stainless steel, preferably stainless steel and can be attached to one another by means of fasteners, bonding or welding. Optionally the adsorber structure itself can be sealed against the walls of the unit by abutting against L profiles affixed into the wall of the unit and further optionally, mechanically integrating the adsorber structure as a structural element of the unit thusly stabilizing the unit. Specifically, for units with rectangular cross section, the axial walls of the adsorber structure can be particularly useful in preventing tilting of parallel walls under loads. Thusly, the sealing and reinforcement of the unit can be combined. Further, the current invention offers benefits against state of the art adsorber structures in which sorbent material is enclosed in individual packets in that there are fewer sealing points which may be prone to failure and therefore fewer chances for bypassing of the sorbent material by the gas flow.

The device may further contain at least one, preferably two apertured plates arranged perpendicular to the axes of the channels, preferably formed by strainers, preferably the apertured plates located at the respective longitudinal upstream and downstream end of the device, with apertures into which the strainers can be shifted.

Further there can be provided an upstream apertured plate with suitably adapted apertures into which the inlet strainers can be shifted and preferably held by fixing means and/or force closure and/or positive engagement, most preferably at the inlet opening of the inlet strainers there is provided a lateral flange for abutment and fixing on the apertured plate and between these apertures the upstream ends of the outlet strainers are mounted.

In addition to that or alternatively there can be provided a downstream apertured plate with suitably adapted apertures into which the outlet strainers can be shifted, and preferably held by fixing means and/or force closure and/or positive engagement, most preferably in that at the outlet opening of the outlet strainers there is provided a lateral flange for abutment and fixing on the apertured plate and between these apertures the downstream ends of the inlet strainers are mounted.

The interspace between all the side walls of the channels of the device thus forms one single contiguous interspace, suitable and adapted to be filled (and emptied if needed) with the particulate adsorber particles preferably in a state in which all the channels/strainers are mounted in the device. In the prior art, only very time and work intensive methods are found for the assembly of complex absorber structures based on granular sorbents. The possibility of filling a complex internally tessellated structure with a granular adsorber material after major assembly is one not encountered in the prior art and a major improvement as will be shown in Example 2. Further, the assembly and filling method allows for rapid changes of geometric properties to adapt to different operation points or sorbent materials. Air channels can be added, removed, or modified in size without altering fundamentally the operating characteristic of the adsorber structure Further details will be shown in the Example 3.

Preferably there can be provided at least one heat exchanger structure in or at the device preferably running at or through the sorbent particle volume, preferably in the form of plates, fins, tubing, in particular for circulation a heat exchange liquid and/or gas, or a combination thereof. Such a heat exchanger structure can for example be used for heating and/or cooling in a direct air capture cycle involving a temperature swing.

So in a further possible embodiment of the device a heat exchanger is integrated into the interspace of the sorbent particle volume to provide heating energy for a temperature swing regeneration processes. Hereby it is integrated in such a manner, that the contiguous nature of the interspace is maintained, thusly supporting the rapid sorbent exchange procedures described.

The heat exchanger can comprise a plurality of conduits, which pass through the interspace and the sorbent particle volume and exchange heat with the enclosing sorbent material through conduction at the surface of the heat exchanger wherein the specific heat transfer surface area preferably lies in the range of 0.1-1 m2/kg, i.e. per kg sorbent material. The conduits can have a spacing between the axes of between 10 and 50 mm and may have an internal diameter—dependent upon the desired process times and the heat transfer fluid—of in the range of 2 mm and 10 mm.

In a further embodiment of the device with heat exchanger, the conduits can be electrically conducting resistance heaters or conduits for the transport of heat transfer fluid such as water or a glycol-water mixture. In a preferred embodiment, the heat transfer fluid can be steam at a near saturation state in relation to the sorbent temperature at that point of the heat phase.

The heat up procedure when using such heat exchangers can be executed in a variety of ways, however the maximum temperature of the heat exchanger surface in contact with the sorbent should remain below 180° C., preferably below 120° C. and the heat transfer fluid is to be applied at a corresponding temperature level.

To optionally further enhance the heat exchange, however sometimes at the expense of further sorbent displacement, the heat exchanger can further be equipped with heat transfer area enhancing plates or fins which in one possible realization can be thin sheets of highly thermally conductive material which is in contact with the sorbent material and is resistant to the conditions of the sorption process. Possible are materials such as aluminum or copper.

The fins can be arranged with their plane normal substantially parallel to the main axis of the conduits and can have a spacing between 5 and 35 mm and can have a material thickness of between 0.05 and 0.5 mm, with their lateral and transverse extensions (along directions orthogonal to the axial extension of the conduits) defined and limited by the sorbent material layer thicknesses. In a further embodiment, a single fin can span at least one, preferably more than one or even more than ten conduits thereby forming a heat exchange sheet between the strainers in the interspace for the sorbent particle volume. In one specific embodiment, a single fin can span all conduits in the adsorber structure and is defined by the maximum extensions of the interspace sorbent volume wherein said fin also has voids enabling the passage of the strainers during assembly of the adsorber structure. Particularly this last embodiment has a number of advantages in terms of stabilizing the strainers as well as a partial compartmentalization of the sorbent material which does not affect substantially how it can be filled or emptied, but supports its retention in the adsorber structure particularly under very high flow rates.

In a specific possible embodiment, the heat exchanger structures can be connected with the permeable walls of the strainers thereby—in the case of a well conducting material such as a metallic mesh—further utilizing the contact area between said walls and the sorbent material as heat exchange surface area. The connection between the heat exchanger and the strainer walls can be realized with a bond of low thermal resistance such as welding, brazing, pressing or using high conductivity thermal adhesives.

Alternatively, the heat exchanger structures can be centered between the strainer walls within the interspace, thereby reducing the maximum conduction distance through the sorbent layer.

By centered is meant herein that the distance between the heat exchanger surface and the nearest permeable strainer wall at a given longitudinal position in the adsorber structure is substantially the same.

In yet a further embodiment, the conduits can also be positioned in essentially 'inactive' sorbent zones which may arise in particular air channel configurations wherein the air flow bypasses a certain small zone of the sorbent material layer due to the main flow field from the inlet to the outlet air channels. Because this sorbent substantially does not contact air, and is therefore inactive in the sorption process, there is correspondingly no loss in replacing/displacing it by a conduit.

In further embodiments and in combination with a heat transfer fluid, heat transfer conduits can be connected at their outlets and inlets to a distributor plenum, which feeds and collects fluid to and from the heat exchanger.

In a further embodiment, heat transfer structures can be fixed in the structure of the DAC unit enclosing the adsorber structure or can be integrated for example into movable isolation elements such as flaps or doors. Said distributor plenum(s), can be in one preferred embodiment integrated into the apertured plate holding the strainers.

In yet a further embodiment, the conduits of the heat transfer structures can run in a single pass through the contiguous sorbent volume. By single pass is meant that each conduit has an inlet and outlet respectively at both extremities of the DAC unit and its length is substantially equal one of the axial extensions of the adsorber structure whereas the axes of the conduits can be oriented in any direction within the adsorber structure preferably, such that the conduit axes are substantially aligned with those of the inlet and outlet channels respectively. Alternatively, the conduits can be bent to form a plurality of loops passing a single heat transfer conduit multiple times through the sorbent volume at a set spacing to its neighbour and having distributor plenums at either ends of the adsorber structure depending on the number of passes. The exact form and location of the loops is herein not restricted and is to be considered an optimization variable in consideration of different strainer and heat exchanger geometries. The single pass embodiment of the heat exchanger conduit increases the number of connections needed to the distributor plenums, thereby increasing the complexity of this element but reduces the length of individual conduits thereby reducing the pressure drop of the heat transfer fluid circuit and is beneficial for high viscosity heat transfer fluids like oils. The looped embodiment reduces the number of connections, but increases the length of each conduit and is thereby better suited to low pressure drop fluids such as steam.

In a further possible embodiment, a heat exchanger can be contacted with the strainer walls by a first outer surface of an air channel heat exchanger and a heat transfer fluid can be contacted with a second inner surface of said heat exchanger wherein further the form of the heat exchanger matches the form of the strainers substantially along the length and cross section and further wherein the heat exchanger can be inserted and removed from the adsorber structure from the either end of the adsorber structure, preferably both sides (inlet and outlet channels), and the heat transfer fluid can be a typical liquid or stream or a non condensable gas wherein hereby heat is transferred to the sorbent material from the heat transfer fluid through the heat exchanger and air channel walls.

In a further embodiment of the invention, a sorbent can be used with effective thermal conductivity being higher than 0.01 W/mK preferably higher than 0.05 more preferably higher than 0.1 W/mK.

In a preferred embodiment of the invention, the characteristic dimension of the adsorber structure as defined by the hydraulic diameter (for non-circular channels being defined as the virtual diameter of a circular tube having, for the same length and the same average flow speed, the same pressure drop as the one considered) can be in the range of 0.6-2.5 m wherein the cross section of the channels characterized by the hydraulic diameter may lie between 10 mm and 350 mm, preferably between 65 mm and 260 mm, with channel lengths of between 0.5 m and 2 m, preferably 0.6 to 1.8 m more preferably in the range of 0.8 to 1.4 m. Gas channels can be rotated up to 1800 around their longitudinal axis and the channels can be tapered along their longitudinal axis with angles measured from the longitudinal axes of 0.5 and 10°.

In a further preferred embodiment of the invention, the ratio of the cumulative flow through area of the channels to the incident cross section of the adsorber structure (defined as the cross section of the full device and not just the sum of the cross sections of the inlet openings of the inlet channels) is greater than 5:1 preferably greater than 15:1, more preferably greater than 20:1 or 25:1. This ratio shall heretofore be called the flow area factor and is a measure of the performance of the adsorber structure. Based on a maximum allowable pressure drop defined by a particular sorbent, the flow area factor defines thereby the maximum volume flow that an adsorber structure can handle and thereby the output of a DAC device. Typically, DAC devices must handle very large air flows on the order of 30-100 Nm3 air/h/kg sorbent while not exceeding pressure drop values of 400 to 1000 Pa. Correspondingly, flow area factors for DAC are significantly larger than those of other adsorption applications which can accept far higher pressure drops or lower specific volume flows.

The particulate adsorber particles can for example be amine functionality carrying polymer-based particles suitable and adapted for carbon dioxide capture and/or at least partly inorganic, organic or active carbon based particles, preferably functionalized with alkali carbonate suitable or with amine functionality and adapted for carbon dioxide capture and/or metal organic frameworks.

The particulate adsorber particles can have a mean particle size in the range of 0.01-5 mm, or in the range of 1-20 mm more preferably in the range of 0.1 to 3 mm and are preferably substantially round along at least one axis or have the property of flowing without substantial mechanical attrition and the carrier structure of which is preferably selected from the group of polymers, ceramics, organic solids, zeolites, metals, clays, capsules or hybrids thereof.

Only when operating a contactor for DAC having the indicated sorbent material size range, with the indicated sorbent material layer thicknesses and the indicated flow area factors, can feasible operation of DAC be considered. With significantly smaller sorbent particles, the kinetics of gas exchanger can be improved, however the pressure drop and the corresponding energy demand for adsorption rise dramatically. With larger sorbent particles, than those indicated, the gas exchanger kinetics can be dramatically worsened reducing the output of a DAC device. With reduced flow area factors the total volume throughput of a DAC device in adsorption is significantly reduced for a given acceptable pressure drop over a sorbent material layer. With thinner sorbent material layers, the pressure drop of the adsorption process indeed falls, however the output of the DAC device also falls linearly. Such a drop cannot be compensated with increased flow throughput as one can rapidly encounter mass transfer limitation, which limit the maximum possible uptake rate. Conversely, increasing the sorbent material layer, will produce a significant increase in the pressure drop in adsorption flow requiring either a reduction of said flow (and correspondingly output of the DAC device) or a significantly higher energy demand and cost for the adsorption process.

For particulate adsorber particles having a mean particle size in the range of 0.1-1.5 mm, a sorbent bed thickness, being contained by a mesh having a mesh width in the range of 150-250 μm, using a structure with a sorbent material layer thickness of 10 to 20 mm and a channel length of 0.75-1.5 m, a flow area factor in the range of 15:1-25:1 proves to provide an optimum compromise for DAC applications in terms of pressure drop and capture properties. Preferably in such a structure use is made of more than 150 up to 250 inlet and outlet strainers, respectively.

The present invention furthermore relates to a method for assembling a device as detailed above. Preferably, according to that method, the inlet and outlet channels are formed by locating corresponding grids in a carrying structure, and subsequently the interspace between these channels is filled by the loose particulate material. According to a preferred embodiment, inlet strainers and outlet strainers forming the inlet and outlet channels, respectively, are produced individually in a first step, the strainers are subsequently mounted in a carrier structure to form the device, and subsequently the contiguous interspace between the strainers is filled with the particulate adsorber particles to form the sorbent particle volume, wherein the particulate adsorber particles can be mechanically agitated once within the interspace to allow for optimum packing.

Furthermore the present invention relates to a method for emptying such a device and or exchanging the particular adsorber particles within such a device in which the interspace is emptied of sorbent material by opening a lower media connection and leaving the strainers unaltered, optionally with mechanical agitation.

There can e.g. be provided at least one, preferably at least two, an upstream and downstream, apertured plate, wherein the inlet strainers and the outlet strainers are shifted into corresponding apertures of respective apertured plates and fixed in this position.

Last but not least the present invention relates to a use of a device as detailed above for capturing carbon dioxide and/or water vapour from a gas stream, preferably a flue gas stream, a greenhouse gas, or atmospheric air gas stream, most preferably in a pressure and/or temperature and/or humidity swing process.

Overall, the invention described herein has been found to be exceptionally well suited to adsorption of $CO_2$ from air because it addresses the needs of very high gas-sorbent contact area and low pressure drop structures while maintaining a high mechanical stability without bypassing. These are features not found in adsorber structures of the prior art and sets this invention significantly apart.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
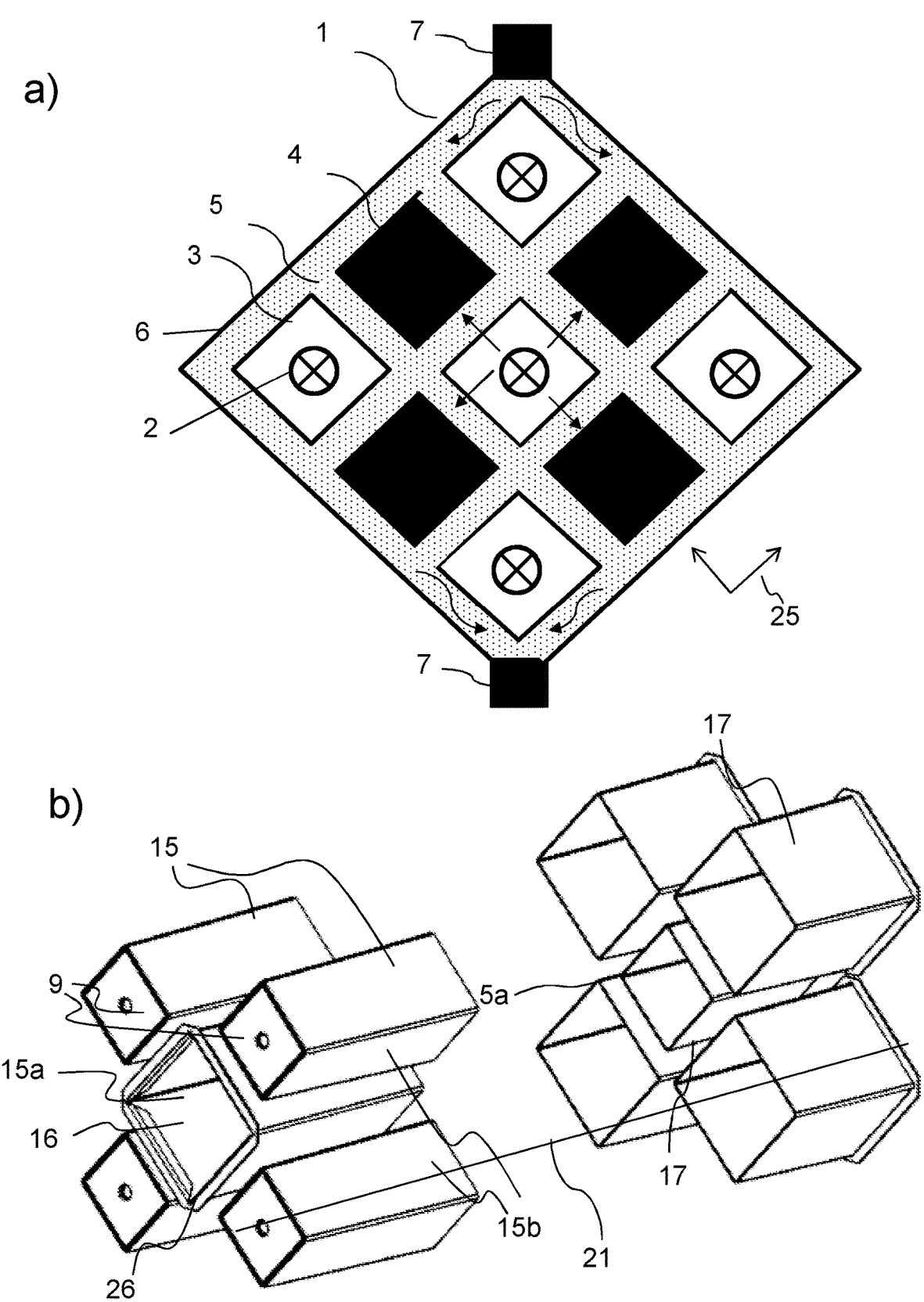
FIG. 1 shows in a) a front section view of a variant of this invention with inlet and outlet channels and a sorbent volume occupying the space between them, the front section view is a cut about at the longitudinal center of the device where the shapes of the inlet and the outlet channels have essentially the same size, in b) an arrangement of strainers (just inlet-section and outlet section) to have sorbent material fill the cavities between strainers and have air pass through as it enters from one side, in c) an exemplary arrangement of a plurality of strainers (just inlet-section and outlet section) in a casing to be placed within a contactor chamber and aerated in longitudinal direction.
Figure 1:
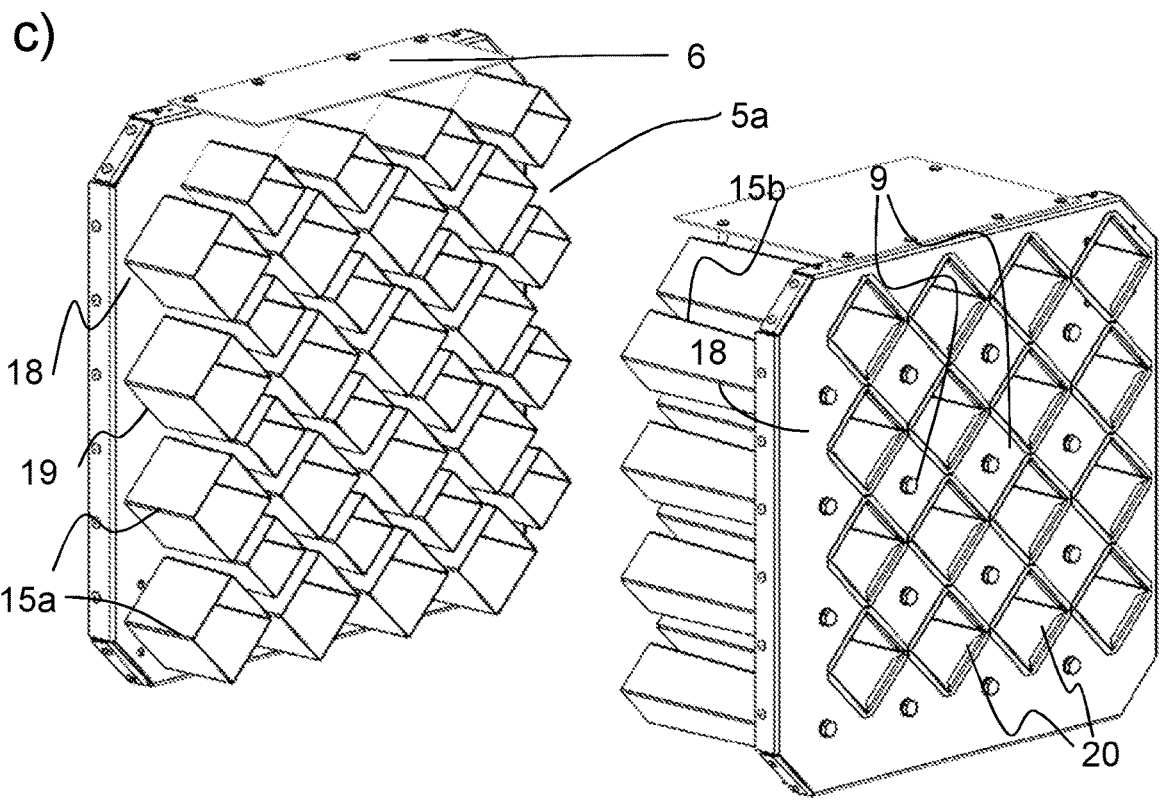

FIG. 1 in a) shows a cross section view through one possible adsorber structure 1 based on this invention in a direction parallel to the air flow and viewed from the direction of inlet gas flow 2 showing five inlet 3 and four outlet gas 4 channels separated each by a layer of sorbent material 5 occupying the space between the gas channels and the circumferential wall 6 and forming the contiguous sorbent particle volume. Gas flow 2 enters the gas inlet channels 3 and as these are impermeable to gas flow at their distal extremity but permeable laterally to the gas flow through the sorbent material layer 5, the gas flow is radially distributed through the sorbent material volume 5 and penetrates it. In this example, the gas channels are seen to be square in cross section and arranged such that flat faces of adjacent gas channels are parallel forming thusly a circumferential sorbent layer of essentially homogenous thickness. The sorbent material is in this example injected into and in a further step can be removed from the adsorber structure by the connections 7 located at the top and bottom of the adsorber structure 1 respectively which offer a media connection into the space 5a between the gas channels 3, 4 and the circumferential wall 6. To support the filling and removal of sorbent material, the gas channels 3, 4 in this example are arranged such that no faces are strictly perpendicular to the global direction of filling or emptying of sorbent; thereby assuring that sorbent material for example filled from the top of the adsorber structure 1 will fill progressively all available spaces in the adsorber structure 1 without forming empty pockets.

FIG. 1 b) schematically shows a sectioned view in a perspective of an arrangement of five grid/strainer structures (for example four inlet 15a and one outlet 15b) or strainers forming the interspace 5a for the granulate adsorbent volume 5 and to have loose particular sorbent material fill the interspace 5a between the strainers 15 further having mesh sidewalls 17 impermeable to the sorbent material but permeable for gas flow. Impermeable end caps 9 are shown as well as the inlet flange 26 of the inlet opening 16 of the inlet strainer; both elements being used for fixing the strainers in the relevant aperture plate (not shown). For clarity, in this figure, the surrounding circumferential wall 6 which would contain the adsorbent volume 5, and seal against the containing structure 14, is not shown. Further the channels shown in the split sections are aligned along the longitudinal axis 21.

FIG. 1 c) shows a split view of an exemplary arrangement of a plurality of inlet 15a and outlet 15b strainers affixed in two aperture plates 18 having holes 19 for fixing the strainers and enclosed in a circumferential wall 6 (only top plate of circumferential wall shown) to be placed within a contactor chamber and aerated in longitudinal direction. The interspace volume 5a is clearly seen between inlet 15a and outlet 15b strainers, the channels of which have a have differing cross sections at the longitudinal position of the split due to the applied taper.

Figure 2:
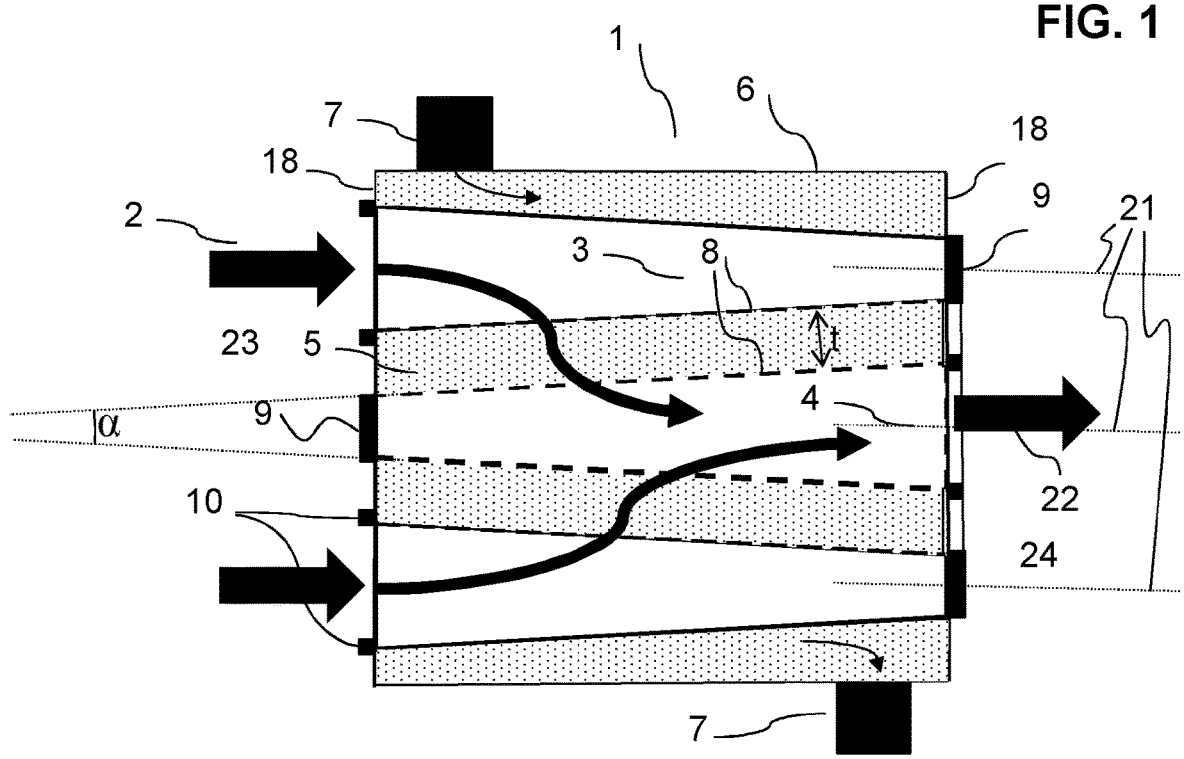
FIG. 2 shows a side section view of a possible variant of this invention with inlet and outlet channels and a sorbent volume occupying the space between them.

FIG. 2 shows a further longitudinal section view of one possible adsorber structure 1 according to this invention in a direction parallel to the air flow and demonstrates the wall flow principle of this invention. An inlet gas flow 2 enters the two inlet gas channels 3 and the due to the lateral/radial permeability of the gas inlet channel 3 formed of a gas permeable circumferential wall 8 of (aluminum or stainless steel) wire mesh and due to the impermeable plug 9 is forced to pass through the sorbent material layer 5 into the neighboring gas outlet channel(s) 4 before exiting the adsorber structure 1 as exiting air stream 22. The inlet channels 3 are in this example tapered with a tapering angle $\alpha$ in a contracting fashion in the global flow direction in such a manner that the axial/lateral velocity of gas does not exceed a specific limiting flow speed and correspondingly the pressure drop—most importantly at the entrance of the inlet channels 3, does not exceed a certain allowable value. The same logic holds for the expanding taper of the outlet channel 4. The inlet and outlet gas channels 3 and 4 at their open ends are held with impermeable rings 10 in their respective axial walls and the space between the channels and the circumferential wall 6 is occupied by sorbent material volume 5 filled through and optionally emptied through the media connections 7.

Figure 3:
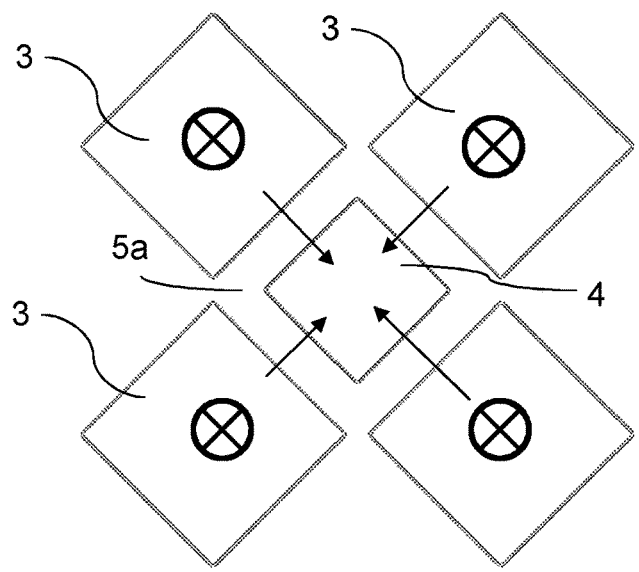
FIG. 3 shows cuts perpendicular to the longitudinal direction through a device viewed from the inlet side, wherein in a) a cut at a longitudinal position closer to the inlet side is given, where the cross section of the inlet channels is larger than of the outlet channels, in b) a cut at a longitudinal position about half way, where the cross section of the inlet channels is the same as of the outlet channels, and in c) a cut at a longitudinal position closer to the outlet side, where the cross section of the outlet channels is larger than of the inlet channels.
Figure 3:
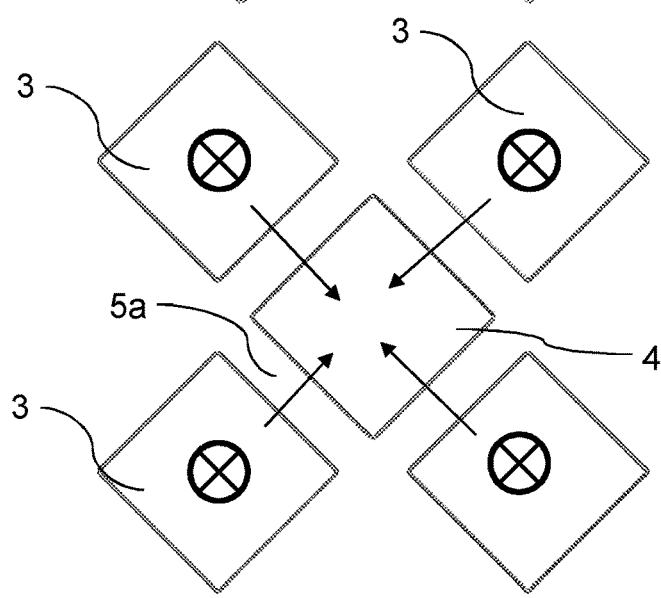
Figure 3:
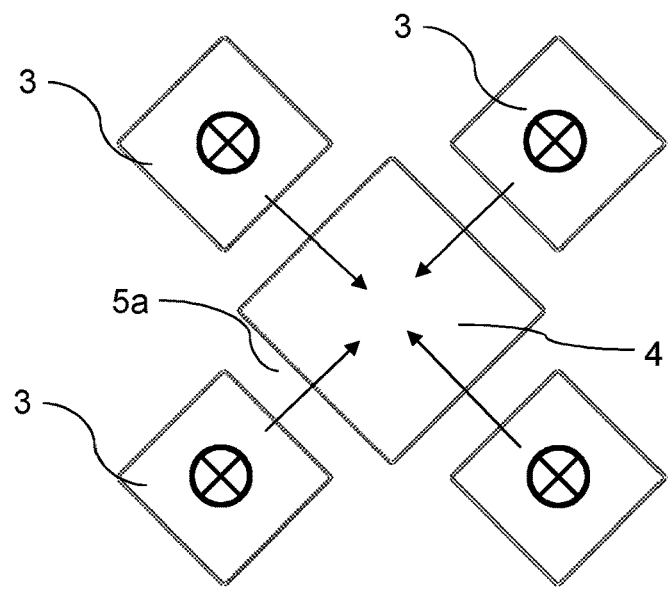

FIG. 3 shows exemplary section views of a portion of one possible adsorber structure at three longitudinal positions along a longitudinal axis 21 through a possible adsorber structure containing inlet channels 3 and outlet 4 channels formed for example of strainers and forming thereby an interspace volume 5a. It is to be understood that these sections are portions of a larger adsorber structure having a plurality of such repeated forms. FIG. 3 a) demonstrates the cross section of the inlet 3 and outlet 4 channels at the of close to the upstream end of the adsorber structure where the highest flows in the inlet channels 3 and lowest flows in the outlet channels 4 (both along the longitudinal axis) are expected and correspondingly the inlet channel 3 cross section is larger than that of the outlet channel 4. FIG. 3b) demonstrates the cross section of the inlet channels 3 and outlet channels in the middle of the adsorber structure where the volume flows in the inlet 3 and outlet 4 channels along the longitudinal axis are essentially equal implying the same cross section of the individual channels. Finally, FIG. 3c) shows the outlet end of or close to outlet of the adsorber structure where the flow in the outlet channel 4 is larger than the flow in the inlet channels 3 along the longitudinal axis and correspondingly the former has a larger cross section than the latter. It is seen that the walls of neighboring inlet and outlet channels are parallel and are separated in all three sections by the same distance resulting in a sorbent layer thickness which is constant between inlet and outlet channels over the longitudinal axis of the adsorber structure. Conversely, the distance between the corners of the channels of the same type (e.g. just inlet) is not constant due to the tapered form. Thusly at any longitudinal position, a regular tessellation of channels and sorbent interspace is formed which in the case of tapered channels is unique at each longitudinal position. Were the channels non-tapered, the tessellation would by identical at each longitudinal position.

Figure 4:
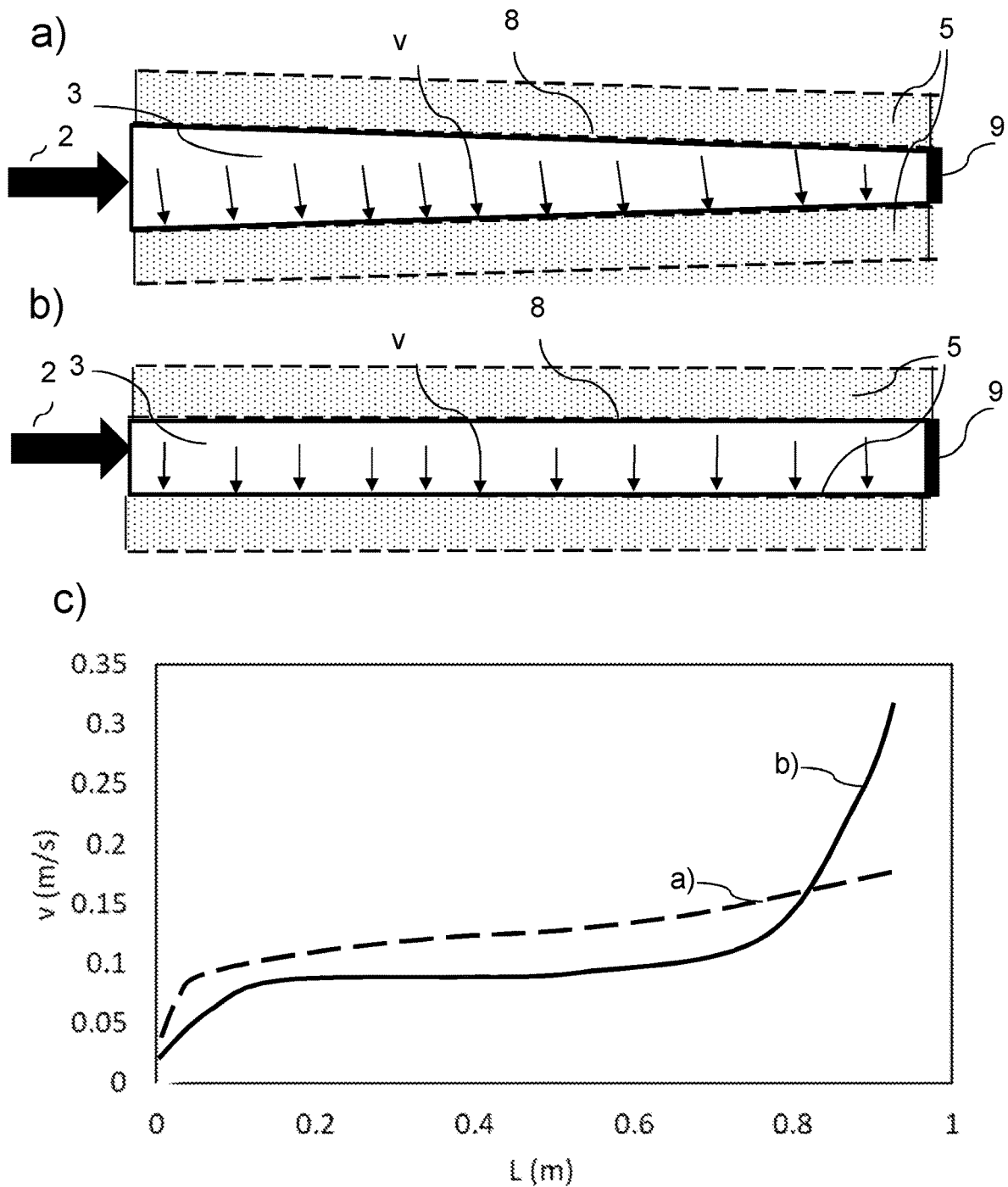
FIG. 4 shows a comparison of the normal gas flow velocity v for variants with a) tapered and b) parallel wall inlet channels in a diagram c)

FIG. 4 shows the impact of tapered inlet channels against channels of continuous cross section. One possible adsorber structure is shown having inlet channels 3 with a length of 0.9 m, being subjected to a inlet gas flow 2 wherein the inlet channel is impermeable sealed at its distal extremity by the impermeable plug 9 and surrounded in a radial fashion (NB: a section view of the adsorber structure is shown) by a sorbent material volume 5. The gas flow normal velocity v through the permeable wall 8 and correspondingly through the sorbent material is shown in FIG. 4c along the longitudinal length L of the inlet channel 3 for tapered in line a) and parallel (i.e. non tapered) in line b) in FIG. 4c) configurations. It was found that the inhomogeneity of the velocity v can be in a parallel channel variant as given in FIG. 4b) very pronounced when compared against that of the tapered variant as given in FIG. 4a). The result of this inhomogeneity can be inhomogeneous sorbent loading with the desired adsorbate yielding a poor utilization of the sorbent and high specific work costs for moving the gas flow. The tapered variant with yields a more homogenous normal velocity v distribution which firstly reduces the effective pressure drops of the sorbent layer as well as improves the sorbent loading. Further improvements can be foreseen to the variant a) such as a sorbent layer thickness with a variability a along the length L of the inlet channel which would further reduce the increasing tail of the curve a) in FIG. 4c) at the extremity of the channel.

Figure 5:
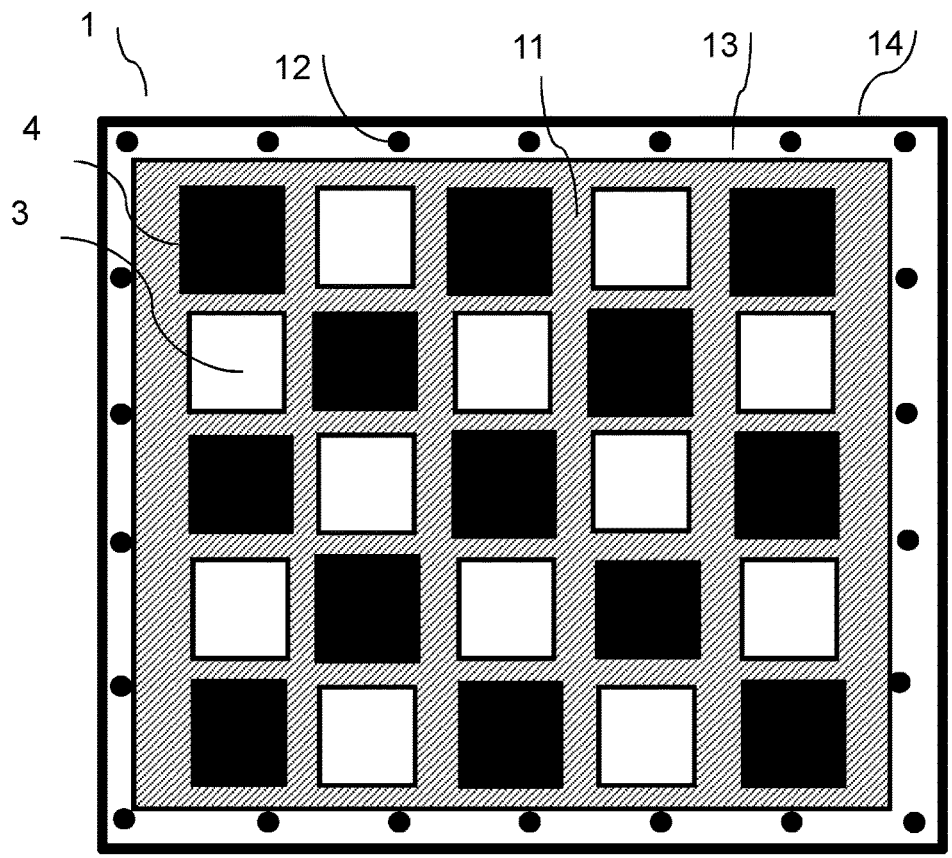
FIG. 5 shows a front view of an adsorption structure mechanically integrated into a containing structure.

FIG. 5 shows the one option of mechanical coupling of the adsorber structure 1 with the containing structure 14 for example a vacuum chamber containing an element for propelling air such as fan. Specifically, in this example an adsorber structure 1 comprising a plurality of inlet 3 and outlet channels 4 with square cross section is mechanically affixed at its axial wall 11 by fasteners 12 to a circumferential flange 13 of the containing structure 14. In this manner tilting or displacement of the containing structure 14 under vacuum or transport loads or its own weight can be carried by the axial wall 11 in the manner of a membrane, preventing potentially damaging displacements. This method of construction is particularly useful for polydirectional load in a plane. Further this effective method of fixing the adsorber structure can be well utilized to seal the adsorber structure 1 against the containing structure 14 thereby preventing bypassing.

Example 1. Structure to Sorbent Ratio

Another possible adsorber structure according to this invention has been analyzed for the ratio of structure to sorbent material and compared to a typical DAC adsorber structure of the prior art with the results shown in the table below:

|  | Sorbent Mass (kg) | Structure Mass (kg) |
| --- | --- | --- |
| This invention | 705 | 484 |
| Prior Art* | 384 | 533 |

*e.g. WO2018083109

The ratio of masses of sorbent to structure for the adsorber structure of this invention structure material is higher than that of the prior art. The higher sorbent mass which can be brought into the adsorber structure of this invention leads to a higher produced $CO_2$ amount per desorption while the lower structure mass reduces the thermal energy demand for a temperature swing desorption process in.

Example 2. Sorbent Replacement Duration

The filling and emptying duration for a device as proposed was compared with a prior art adsorber structure having the same substantial envelope dimensions. The adsorber structure of this invention in this example consisted to seven inlet and outlet channels of square cross section and a globally square cross sectional adsorber structure with characteristic dimension according to the hydraulic diameter of 0.65 m and a length of 0.9 m. The adsorber structure was filled with 80 kg of sorbent material suitable for DAC application in 10 min. The structure could also be emptied in 10 minutes. As a comparison, an adsorber structure of the prior art consisting of 14 frame elements built into a stack required a filling time of 140-280 minutes for 65 kg of sorbent (despite the envelope dimensions being equal) and an emptying time of ca. 200 minutes. As such the single sorbent volume feature of this invention leads to enormous time and cost savings for sorbent replacement operations.

Example 3. Proof of Concept of Adsorber Structure

Figure 6:
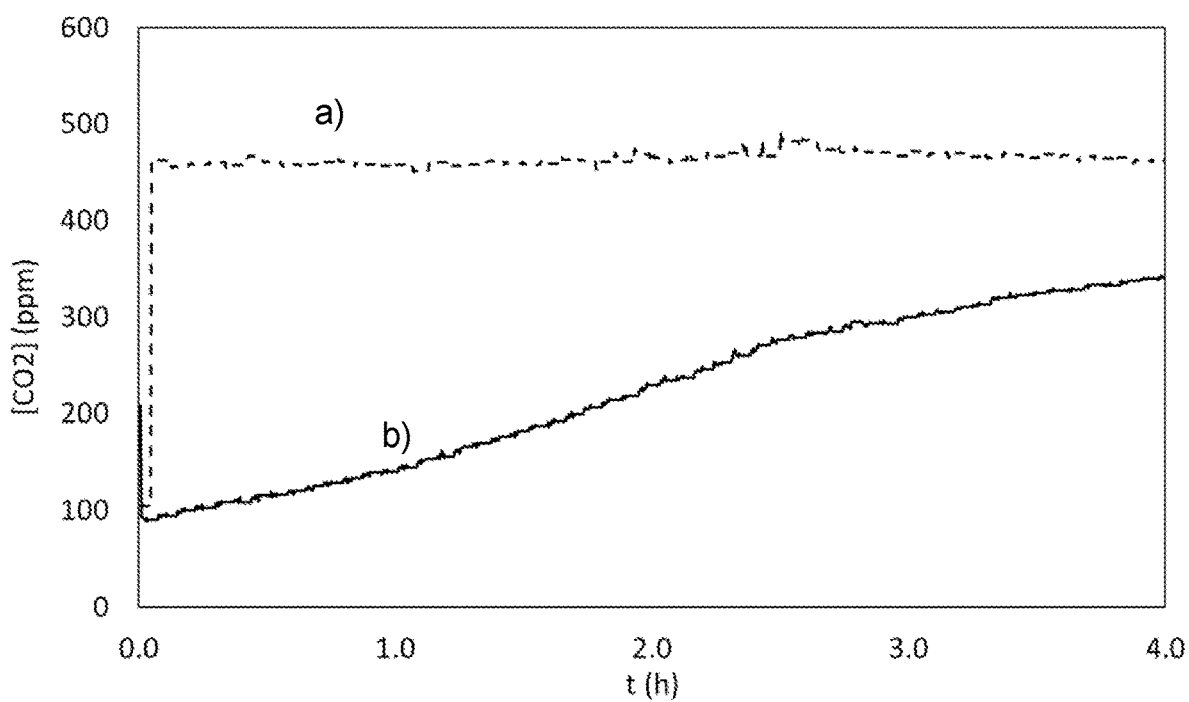
FIG. 6 shows breakthrough curves of $CO_2$ when passed through an adsorber structure according to this invention with a) being the inlet $CO_2$ concentration and b) the outlet concentration.

The invention herein disclosed has been tested for adsorption performance with a common amine functionalized DAC sorbent material. Said adsorber structure was realized with 100 inlet and 100 outlet channels realized with a tapering square cross section and forming a spacing of 28 mm between porous walls of the air channels substantially along the complete 1.1 m length of the channels. The ratio of the through flow area of the channels to the incident flow area of the adsorber was in this case 19.3 producing a corresponding reduction in the gas flow velocity through the sorbent material by this factor. The structure was filled with a common sorbent material suitable for DAC based on the prior art (WO2019092127) having pellets of mean particle size of 0.8-1.4 mm utilizing an alkali carbonate functionalization and having a BET surface area less than 500 m2/g and a mean pore diameter in the range of 2-50 nm and exposed to an airflow of 20 000 Nm3/h. A typical breakthrough curve under adsorption was recorded and is shown in FIG. 6 for the uptake of CO2 from atmospheric air with a) showing the inlet CO2 concentration to the adsorber structure and b) the outlet concentration from the adsorber structure. A pressure drop over the complete adsorber structure of 345 Pa was recorded and an attractive CO2 uptake over the duration of a possible CO2 adsorption stage of 4 hours was demonstrated proving the suitability of the adsorber structure for DAC applications. As an aside, because the adsorber structure of this invention has significantly fewer sealing points against prior art structures, it is foreseeable, that its performance will remain constant whereas that of prior art structures could over time deteriorate due to the growth of bypassing zones leading to an overall decrease in $CO_2$ capture efficiency.

In a further investigation, the adsorber structure of this example was filled with a second common sorbent material suitable for DAC based on spherical polymer granules of mean particle size of 0.5-0.8 mm utilizing a primary amine functionalization having an amine concentration of greater than 2 eq/L, but having a different pore architecture characterized by 30-50 m2/g specific BET surface area and a more nano-porous pore size in the range of 20-50 nm. To adapt to the presumed higher uptake kinetics of this sorbent, a higher gas flow rate of 28,000 Nm3/h was applied to the adsorber structure while a reduced sorbent material layer of 21 mm was used to retain the pressure drop at a manageable level. Surprisingly the breakthrough curve of this modified structure and sorbent combination was largely the same as that of FIG. 6 while the pressure drop increased to 380 Pa. This example shows further the superb capabilities of the disclosed invention to be very easily adapted to different operating points and sorbent characteristics.

Figure 7:
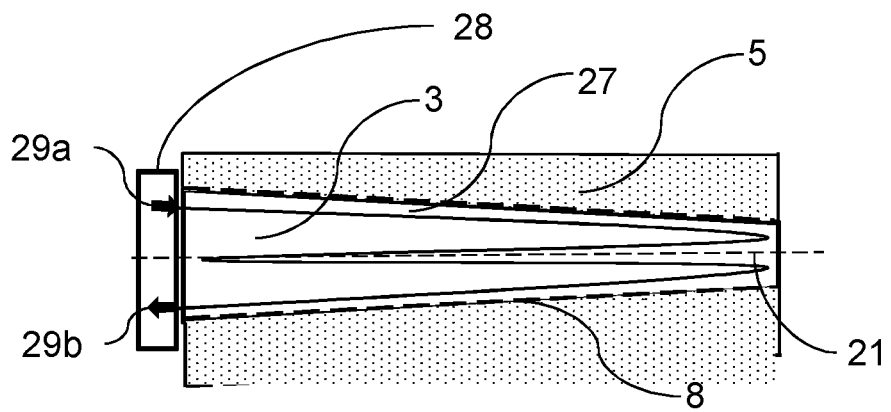
FIG. 7 shows a cross sectional view of a) looping and b) single pass heat exchanger conduits integrated into the contiguous sorbent volume superimposed on the strainer wall including distributor plenums.
Figure 7:
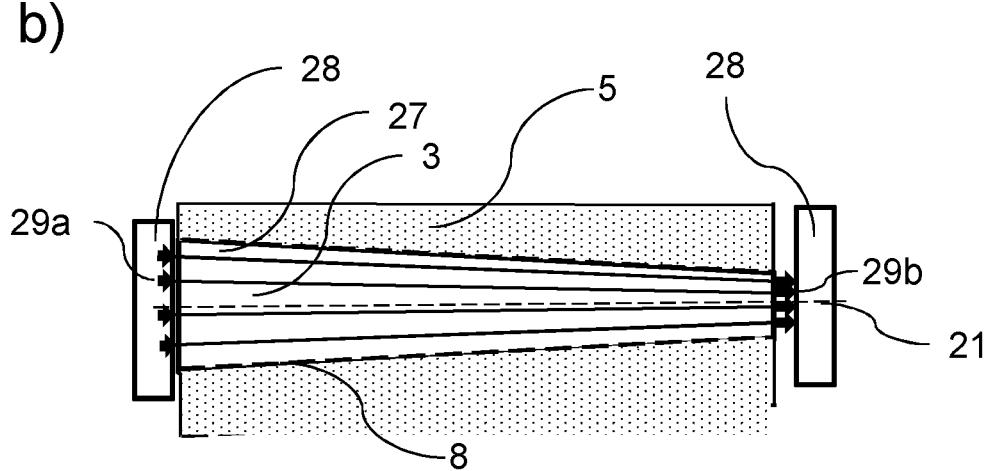

FIG. 7 shows two possible realizations of a heat exchanger integrated into the proposed adsorber structure wherein in a), a looping realization of the conduit 27 is applied and shown superimposed on an inlet air channel 3 which borders a sorbent particle volume 5 by a permeable wall of a strainer 8. The heat transfer fluids inlet 29a and outlet 29b are contained in the same distributor plenum 28 in this case from the same side of the adsorber structure. In b) the single pass heat transfer fluid conduits are fed from the distributor plenum 28 through the inlet 29a and collected in the distributor at the outlet 29b with both distributor plenums being at both extremities of the adsorber structure. In this example, the main axial direction of the conduits follows the main axis of the air channels 21, but could equally well be placed unaligned with this axis.

Figure 8:
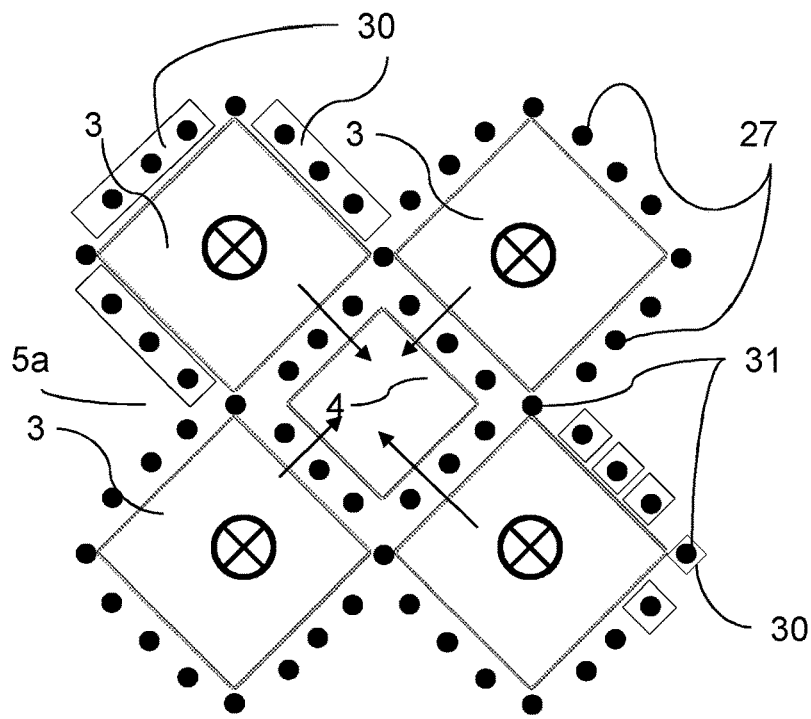
FIG. 8 shows a front view of the adsorber structure with heat exchanger conduits integrated into the contiguous sorbent volume between the air inlet and outlet channels partially shown with two forms of fins spanning at least one heat transfer conduit and including the special case of heat transfer conduits placed in inactive zones.

FIG. 8 shows the front view of the adsorber structure at a particular cross section with the heat exchanger conduits 27 distributed in the interspace 5a for the sorbent particle volume 5 around the inlet 3 and outlet 4 channels. In this example, the conduits are not in contact with the strainer walls of the inlet or outlet channels and are substantially centered in the interspace 5. For illustrative purposes, certain conduits have fins 30, which in this example are shown to enclose single conduits as well as three conduits. The special conduits in the inactive zone of the adsorber structure 31 are also shown, where there is no air flow expected in the adsorption and correspondingly inactive sorbent.

Example 4. Dimensioning of a Heat Exchanger for an Adsorber Structure

Figure 9:
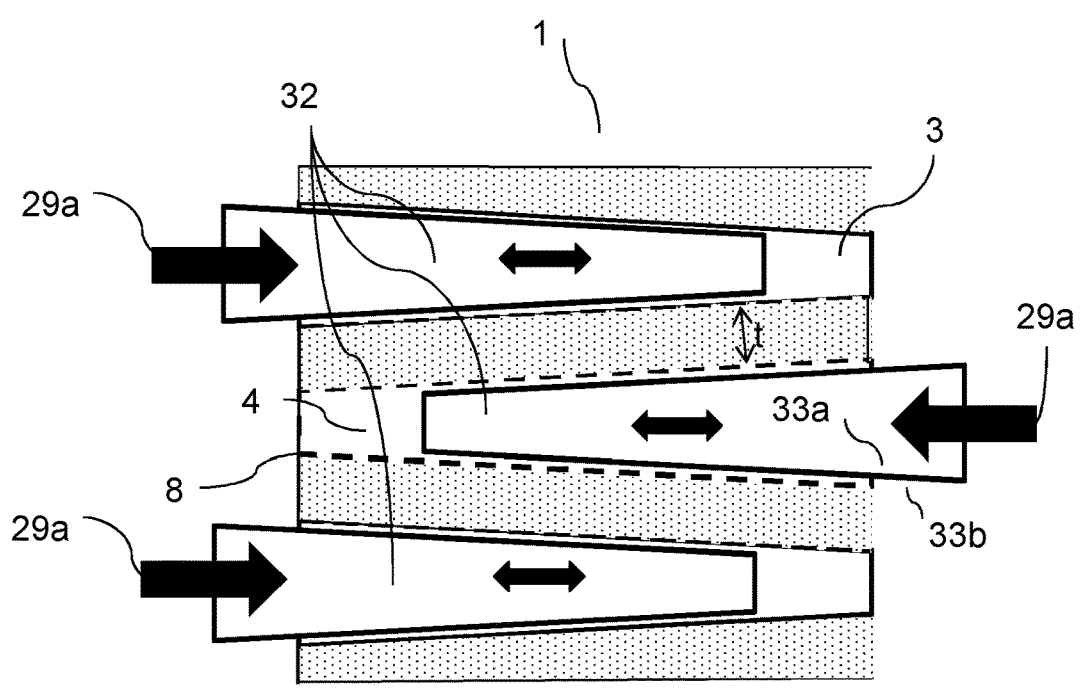
FIG. 9 shows a cross sectional view of a movable heat exchanger integrated into air channels contacting the walls of the strainers.

In this example, one possible variant of the adsorber structure with a heat exchanger is presented wherein the conduits pass a heat transfer fluid and are affixed to the strainer walls—these being realized with a wire mesh—on both the inlet and outlet air channels of the strainers. In this example, the adsorber structure has dimensions of 0.6×0.6× 0.6 m (width, height, depth) and a sorbent capacity of 70 kg. The thermal conductivity of the granular sorbent material is assumed to be around 0.08 W/mK. The strainers in this example use a constant square cross section of 45 mm at the inlet opening 16 and outlet opening 20 respectively and are separated by a sorbent material layer of 30 mm giving 8 strainers per transverse direction or a total 128 (as seen from one end of the adsorber structure) inlet and outlet strainers respectively. For this geometry, conduits of 4 mm outer diameter are placed on the strainer walls with a spacing of 11 mm leading to 3 conduits per inlet or outlet strainer wall or 12 conduits per inlet or outlet strainer which are in this example thermally connected with the wire mesh leading to a specific heat transfer surface area of 0.27 $m^2$/kg sorbent. In this adsorber structure 5.4 kg (i.e. less than 1%) of sorbent material are displaced by the herein described heat exchanger. If the conduits for the heat transfer fluid are realized in the looping embodiment, a distributor plenum will have 128 heat transfer fluid connections for example at the air inlet extremity of the adsorber structure and built into the apertured plate. FIG. 9 shows one possible variant for a movable heat exchanger integrated into the air channels in the desorption. The air channel heat exchanger elements 32 can be inserted into the inlet 3 and outlet 4 air channels such that their outer surface 33b is contacted with permeable walls of the strainers 8. Further an inlet flow of heat transfer fluid 29a—in this example steam—is injected into the heat exchanger such that it contacts the inner surface 33a, thereby delivering heat from the heat transfer fluid through the walls of the heat exchanger, the walls of the strainer and into the sorbent.

| LIST OF REFERENCE SIGNS | |
|---|---|
| 1 | adsorber structure |
| 2 | gas inflow |
| 3 | inlet channel |
| 4 | outlet channel |
| 5 | sorbent particle volume |
| 5a | interspace for 5 |
| 6 | circumferential wall of the whole structure |
| 7 | media connections |
| 8 | permeable wall of strainer |
| 9 | impermeable plug/end cap |
| 10 | impermeable ring |
| 11 | axial wall |
| 12 | fasteners |
| 13 | circumferential flange |
| 14 | containing structure |
| 15 | strainer |
| 15a | inlet strainer |
| 15b | outlet strainer |
| 16 | inlet opening of 15a |
| 17 | mesh sidewall of 15 |
| 18 | apertured plate |
| 19 | hole in 18 for 15a |
| 20 | outlet opening of 15b |
| 21 | axis of strainer, longitudinal direction |
| 22 | gas outflow |
| 23 | upstream end |
| 24 | downstream end |
| 25 | lateral directions |
| 26 | lateral flange |
| 27 | heat exchanger conduits |
| 28 | distributor plenum |
| 29a | heat transfer fluid inlet |
| 29b | heat transfer fluid outlet |
| 30 | heat exchanger fins |
| 31 | inactive zone conduits |
| 32 | heat exchange channel |
| 33a | inner surface of heat exchange channel |
| 33b | outer surface of heat exchange channel |
| v | normal velocity |
| α | opening angle |
| σ | variability of sorbent layer thickness |
| L | length |
| t | lateral thickness |

The invention claimed is:

1. A device for separation of at least one gaseous component of a gas stream containing said at least one component as well as further different gaseous components, by using a bed of loose particulate adsorber particles contained in at least one sorbent particle volume, said gas stream entering the device at an upstream end thereof and exiting the device as a gas outflow at a downstream end thereof, said device comprising:
at least two inlet channels as well as at least two outlet channels being in said sorbent particle volume,
wherein the inlet channels and outlet channels are mutually intertwined at least partly to form a nested structure in said sorbent particle volume and wherein the inlet channels and outlet channels are arranged with respective principal axes all essentially parallel to each other, wherein said inlet channels have at the upstream end at least one inlet opening through which said gas stream enters the device, and being closed to airflow at the downstream end, wherein said upstream end and downstream end of the inlet channels are connected by one or a plurality of side walls circumferentially enclosing and forming said inlet channel in said sorbent particle volume;

wherein said outlet channels are closed at the upstream end and have at the downstream end at least one outlet opening through which the gas outflow is exiting the device, wherein said upstream and downstream end of the outlet channels being connected by one or a plurality of side walls circumferentially enclosing and forming said outlet channel in said sorbent particle volume;

wherein said side walls are permeable to the gas stream but impermeable for said loose particulate adsorber particles, and wherein, viewed along the principle axes of the inlet channels and outlet channels, the inlet channels and outlet channels are alternatingly arranged in both lateral dimensions so that said sorbent particle volume is confined by the interspace defined by adjacent side walls of inlet channels and neighbouring outlet channels and said sorbent particle volume surrounding the channels essentially circumferentially around said principal axes of the inlet channels and outlet channels, wherein the inlet channels are formed by inlet strainers and the outlet channels are formed by outlet strainers, and wherein the device contains at least four inlet strainers and at least four outlet strainers, wherein the interspace between all the side walls of the channels of the device forms one single contiguous interspace forming one single contiguous sorbent particle volume suitable and adapted to be filled with and emptied from the particulate adsorber particles in a state in which all the channels in the form of inlet strainers and outlet strainers, are mounted in the device.

2. The device according to claim 1, wherein the cross-sectional shape of at least one of the inlet channels and of the outlet channels is circular, oval, polygonal, or a combination thereof.

3. The device according to claim 1, wherein the cross-sectional shape of at least one of the inlet channels and of the outlet channels is essentially the same in the sense of geometrical similarity or exactly the same, along the axial length thereof between the upstream end and the downstream end.

4. The device according to claim 1, wherein the cross-sectional shape of the inlet channels and of the outlet channels is triangular, square or a regular hexagon.

5. The device according to claim 1,
wherein the inlet channels are closed at respective downstream ends of the inlet channels by a corresponding laterally arranged end plate, and
wherein the outlet channels are closed at respective upstream ends of the outlet channels by a corresponding laterally arranged end plate.

6. The device according to claim 1, wherein the side walls are provided by a mesh or grid structure, the mesh width of which is smaller than the smallest particle size of said particulate adsorber particles.

7. The device according to claim 6, wherein there are provided two layers of grid, one first layer or cage with a grid mesh width which is substantially larger than the smallest particle size of said particulate adsorber particles, acting as a carrier grid or cage, and mounted thereon, on the side facing the particulate adsorber particles, a second layer with a grid wire, including metal wire or polymer fibres having mesh width smaller than the smallest particle size of said particulate adsorber particles, acting as retaining grid.

8. The device according to claim 7, wherein the wire thickness of the carrier grid is larger than the wire thickness of the retaining grid with or without further supporting grids integrated into the air channels.

9. The device according to claim 1, wherein the inlet channels as well as the outlet channels are enclosed by a circumferential enclosing wall as well as an upstream and downstream axial wall.

10. The device according to claim 1, wherein it contains at least one, or two apertured plates arranged perpendicular to the axes of the channels.

11. The device according to claim 1, wherein the particulate adsorber particles are amine functionality carrying polymer-based or inorganic particles suitable and adapted for carbon dioxide capture or are at least partly inorganic, organic or active carbon based particles.

12. The device according to claim 1, wherein it is for the separation of at least one of carbon dioxide and water vapour from an air stream.

13. The device according to claim 1, wherein it comprises one single contiguous sorbent particle volume, and wherein the minimum thickness thereof, defined as the distance between adjacent side walls of neighbouring inlet and outlet channels, is at least 5 mm, or at least 7 mm, or at least 10 mm, or at least 15 mm
or the thickness thereof is in the range of 5-50 mm, 5-25 mm or 10-30 mm or 7-18 mm.

14. The device according to claim 13, wherein the thickness is given over at least 70% of the side walls, or over at least 80%, or 90% of the side walls, or over all of the side walls in the device.

15. The device according to claim 13, wherein said sorbent particle volume is surrounds the channels circumferentially around said principal axes of the inlet channels and outlet channels over at least 70% or at least 90% or of over essentially the whole of an axial length of the inlet channels and outlet channels.

16. The device according to claim 1, wherein the cross-sectional shape of at least one the inlet channels and of the outlet channels is triangular, rectangular or hexagonal.

17. The device according to claim 1, wherein the cross-sectional shape of at least one the inlet channels and of the outlet channels forming a regular triangle, square or a regular hexagon.

18. The device according to claim 1, wherein the flow area factor of the device, defined as the ratio of the cumulative flow through area of the channels to the incident cross section of the adsorber structure is greater than 5:1 or greater than 15:1, or greater than 20:1 or 25:1.

19. The device according to claim 1, wherein the cross-sectional shape of at least one the inlet channels and of the outlet channels is essentially the same in the sense of geometrical similarity or exactly the same, along the axial length thereof between the upstream end and the downstream end, wherein the size of this cross-sectional shape is decreasing from the upstream end to the downstream end in case of the inlet channels and the size of the cross-sectional shape is increasing from the upstream end to the downstream end in case of the outlet channels.

20. The device according to claim 19, wherein from the upstream end to the downstream end the cross-sectional shape reduces in area in the range of 5-50% for the inlet channels and from the downstream end to the upstream end in area in the range of 5-50% for the outlet channels, or wherein the opening angle ($\alpha$) of the inlet and/or outlet channels, defined as the average angle between opposite sidewalls thereof, is in the range of 0-60°, or in the range of 0.2-30° or 2-15°, or in the range of 0.2-2° or 3-7°.

21. The device according to claim 1, wherein the size of the cross-sectional shape of the inlet channels and of the outlet channels at any given longitudinal position of the device is essentially the same for all channels.

22. The device according to claim 1, wherein the size of the cross-sectional shape is essentially the same at any longitudinal positions just for the inlet channels and respectively essentially the same at any longitudinal positions just for the outlet channels.

23. The device according to claim 22, wherein the size of the geometrically similar cross-sectional shapes is, continuously, increasing in a downstream direction for the outlet channels and is, continuously, increasing in a upstream direction for the inlet channels.

24. The device according to claim 1, wherein adjacent side walls of neighbouring channels are arranged parallel to each other, forming a regular tessellation with interspaces in the lateral directions, with either essentially the same lateral distance at any given longitudinal position between distanced adjacent inlet and outlet channels, or with adjacent inlet and outlet side walls forming sorbent particle layers of a lateral thickness which is varying over the longitudinal direction by at most 50%, or at most 30%.

25. The device according to claim 1, wherein each of the inlet channels is closed at a downstream end of the inlet channel by a laterally arranged end plate and wherein each of the outlet channels is closed at an upstream end by a laterally arranged end plate, wherein these end plates are provided with means for mounting strainers forming the channels in a carrier structure.

26. The device according to claim 1, wherein the side walls are provided by a mesh or grid structure, the mesh width of which is smaller than the smallest particle size of said particulate adsorber particles, wherein the mesh is a wire grid, including a metal or polymer wire grids.

27. The device according to claim 26, wherein the side walls are provided by a mesh or grid structure with an aluminium or stainless steel metal wire grid.

28. The device according to claim 1, wherein the device contains at least eight, or at least 16 or at least 100 inlet strainers and at least four, or at least eight, or at least 16 or at least 100 outlet strainers.

29. The device according to claim 1, wherein there is an equal number of inlet strainers and outlet strainers, and wherein the device is surrounded by a circumferential enclosing wall and offering a gas seal against a containing structure housing the device.

30. The device according to claim 1, wherein the inlet channels as well as the outlet channels are enclosed by a circumferential enclosing wall as well as an upstream and downstream axial wall, said walls having a circumferential flange abutting against another flange of a containing structure housing the device, and wherein the device can be opened on the upper side, or is provided with at least one media connection, by way of which the interspace forming the sorbent particle volume can be filled with said particulate adsorber particles and at least one further lower media connection or re-sealable opening, on the lower side, through which the particulate adsorber particles can be emptied.

31. The device according to claim 1, wherein it contains at least one, or two apertured plates arranged perpendicular to the axes of the channels, formed by strainers, with apertures into which the strainers can be shifted, wherein there is provided an upstream apertured plate with suitably adapted apertures into which the inlet strainers can be shifted and held by fixing means and/or force closure and/or positive engagement, in that at the inlet opening of the inlet strainers there is provided a lateral flange for abutment and fixing on the apertured plate and between these apertures the upstream ends of the outlet strainers are mounted, and there is provided a downstream apertured plate with suitably adapted apertures into which the outlet strainers can be shifted, and held by fixing means and/or force closure and/or positive engagement, in that at the outlet opening of the outlet strainers there is provided a lateral flange for abutment and fixing on the apertured plate and between these apertures the downstream ends of the inlet strainers are mounted.

32. The device according to claim 1, wherein there is provided at least one heat exchanger structure in or at the device running at or through the sorbent particle volume, in the form of plates, tubing, for circulation of a heat exchange gas and/or liquid, fins, or a combination thereof.

33. The device according to claim 1, wherein the particulate adsorber particles are amine functionality carrying polymer-based or inorganic particles suitable and adapted for carbon dioxide capture or are at least partly inorganic, organic or active carbon based particles, functionalised with alkali carbonate or with amine functionality suitable and adapted for carbon dioxide capture or metal organic frameworks.

34. The device according to claim 1, wherein the particulate adsorber particles have a particle sizes in the range of 0.01-5 mm or in the range of 1-20 mm and have the property of flowing without substantial mechanical attrition and the carrier structure of which is selected from the group of polymers, ceramics, organic solids, zeolites, metals, clays, capsules or hybrids thereof.

35. The device according to claim 1, wherein the cross-sectional shape of at least one of the inlet channels and of the outlet channels is circular, oval, polygonal, or a combination thereof.

36. A method for assembling a device according to claim 1, wherein inlet strainers and outlet strainers forming the inlet and outlet channels, respectively, are produced individually in a first step, and wherein the strainers are subsequently mounted in a carrier structure to form the device, and wherein subsequently the contiguous interspace between the strainers is filled with the particulate adsorber particles to form the sorbent particle volume, with or without mechanical agitation once the particulate adsorber particles are within the interspace.

37. The method according to claim 36, wherein there is provided at least one, or at least two, an upstream and downstream, apertured plate, wherein the inlet strainers and the outlet strainers are shifted into corresponding apertures of respective apertured plates and fixed in this position.

38. A method of capturing at least one of carbon dioxide and water vapor from a gas stream using a device according to claim 1.

39. The method according to claim 38, wherein the gas stream is a flue gas stream, a greenhouse gas, or atmospheric air gas stream.

40. The method according to claim 38, wherein it is captured in a pressure and/or temperature and/or humidity swing process.

* * * * *